(12) United States Patent
Medina-Bernal et al.

(10) Patent No.: US 12,572,804 B1
(45) Date of Patent: Mar. 10, 2026

(54) METHOD AND SYSTEM FOR NEURAL NETWORK CONFIDENCE REGULATION VIA TEMPERING FACTOR

(71) Applicant: Applied Underwriters, Inc., Omaha, NE (US)

(72) Inventors: Diego I. Medina-Bernal, Cave Creek, AZ (US); Justin N. Smith, Belmont, CA (US)

(73) Assignee: Applied Underwriters, Inc., Omaha, NE (US)

( * ) Notice: Subject to any disclaimer, the term of this patent is extended or adjusted under 35 U.S.C. 154(b) by 0 days.

(21) Appl. No.: 19/253,802

(22) Filed: Jun. 28, 2025

Related U.S. Application Data

(63) Continuation-in-part of application No. 17/450,473, filed on Oct. 11, 2021, which is a continuation of application No. 15/975,840, filed on May 10, 2018, now Pat. No. 11,176,475, and a continuation of application No. 15/161,452, filed on May 23, 2016, now Pat. No. 9,971,973, and a continuation of application No. 14/321,905, filed on Jul. 2, 2014, now abandoned.

(60) Provisional application No. 61/950,912, filed on Mar. 11, 2014.

(51) Int. Cl.

| | |
|---|---|
| ***G06N 3/08*** | (2023.01) |
| ***G06F 16/2458*** | (2019.01) |
| ***G06N 3/0499*** | (2023.01) |

(52) U.S. Cl.
CPC .......... *G06N 3/08* (2013.01); *G06F 16/2462* (2019.01); *G06N 3/0499* (2023.01)

(58) Field of Classification Search
CPC .......... G06N 3/08; G06N 3/0499; G06N 3/02; G06F 16/2462
See application file for complete search history.

(56) References Cited

U.S. PATENT DOCUMENTS

| | | | | |
|---|---|---|---|---|
| 2020/0293878 | A1* | 9/2020 | Bhaskar | G06Q 30/0201 |
| 2020/0364540 | A1* | 11/2020 | Elsayed | G06N 3/0895 |
| 2021/0358577 | A1* | 11/2021 | Zhang | G06N 3/0499 |
| 2025/0077870 | A1* | 3/2025 | Mueller | G06N 3/084 |

* cited by examiner

*Primary Examiner* — Dave Misir
(74) *Attorney, Agent, or Firm* — Marin Patents LLC; Gustavo Marin

(57) ABSTRACT

A system and method for neural network confidence regularization is disclosed. A classification system uses a neural network training model to generate prediction. The confidence of the neural network training model is adjusted based on feature prevalence. The system processes mixed data types (binary, categorical, continuous, and date) through type-specific transformations and tensor construction. A tempering factor is calculated from the unweighted sum of features and applied to intermediate neural network outputs. This tempering mechanism reduces model confidence when several low-weight features are present, enabling faster convergence, better generalization, and improved classification accuracy compared to standard neural networks, particularly for complex non-linear relationships in tabular data domains.

18 Claims, 13 Drawing Sheets

METHOD AND SYSTEM FOR NEURAL NETWORK CONFIDENCE REGULATION VIA TEMPERING FACTOR

BACKGROUND OF THE INVENTION

Field of the Art

The disclosure relates to the field of machine learning and artificial intelligence, and more particularly to the field of improving neural network architectures for classification of tabular data.

Discussion of the State of the Art

Neural networks have emerged as powerful tools for processing and analyzing various types of data. These computational models, inspired by the human brain's structure, consist of interconnected nodes or "neurons" organized in layers that process information and learn patterns from data. While neural networks have demonstrated exceptional performance in domains such as image recognition and natural language processing, they often face challenges when applied to tabular data.

Tabular data, characterized by its organization into rows and columns (similar to spreadsheets or database tables), represents one of the most common data formats in business and scientific applications. Each row typically corresponds to an observation or entity, while columns represent various attributes or features. Different instances in tabular data can contain vastly different amounts of information, with some rows having many active features and others having few. Examples include financial records, medical patient data, insurance claims information, and customer transaction histories. Tabular data typically contains a mix of numerical, categorical, and binary features with differing scales, densities, and information content. In tabular datasets, the predictive signal is often distributed across many weakly predictive features rather than concentrated in a few strongly predictive features.

Neural networks trained on tabular data frequently exhibit overconfidence in incorrect predictions. This phenomenon manifests when the network assigns high probability scores to predictions that are factually incorrect. Overconfidence prevents the model from properly learning from the data and limits its ability to converge on optimal solutions during training.

Existing approaches to address neural network overconfidence include ensemble methods, Bayesian neural networks, and various regularization techniques. These techniques optimize or enhance the performance of the neural networks by normalizing numerical features to consistent scales, or by converting categorical variables into numerical representations through techniques such as one-hot encoding or embedding layers.

However, despite these optimizations, traditional neural networks produce high-confidence predictions that are incorrect, which significantly hampers convergence and performance, particularly in tabular data domains.

Neural network overconfidence creates specific computational problems in computer systems that impact hardware efficiency and system performance. Overconfident predictions lead to inefficient gradient updates and poor convergence, requiring excessive training iterations that consume unnecessary computational cycles and memory bandwidth. This forces suboptimal utilization of parallel processing hardware such as GPUs and TPUs, as unstable training prevents optimal learning rate selection and requires conservative hyperparameter choices that underutilize available computational resources. Traditional approaches to address overconfidence, such as ensemble methods or Bayesian neural networks, exacerbate these computer-specific problems by requiring complex architectures with multiple model instances that increase memory requirements exponentially, or computationally expensive sampling operations that further burden system resources. These gradient oscillations and training instabilities waste computational resources and prevent neural networks from achieving optimal performance on available hardware infrastructure.

Neural networks often struggle to match the performance of traditional machine learning algorithms (such as gradient-boosted decision trees or random forests) when processing tabular data. Further, these approaches often increase model complexity, computational requirements, or require significant domain expertise to implement effectively.

Hence there is a need for improved system and method to enable neural networks to regulate their confidence levels and achieve better performance in classification tasks.

SUMMARY OF THE INVENTION

The present invention addresses specific computational problems in computer systems that arise from neural network overconfidence when processing tabular data. Traditional neural networks exhibit overconfidence that creates several computer-specific technical problems that impact hardware efficiency and system performance. Overconfident predictions lead to inefficient gradient updates and poor convergence, requiring excessive training iterations that consume unnecessary computational cycles and memory bandwidth. This forces suboptimal utilization of parallel processing hardware such as GPUs and TPUs, as unstable training prevents optimal learning rate selection and requires conservative hyperparameter choices that underutilize available computational resources.

In some embodiments, the tempering mechanism provides a technological solution specifically designed for computer systems by implementing hardware-optimized confidence regulation that enables efficient utilization of parallel processing resources. Unlike abstract mathematical approaches, the disclosed system integrates specialized vector processing units with SIMD instruction sets that execute tempering calculations in parallel with minimal computational overhead. The system achieves specific technological improvements including enabling substantially higher learning rates than conventional approaches, thereby significantly reducing training time and computational resource consumption. In certain implementations, the computational overhead of the tempering mechanism is maintained at a small fraction of total neural network processing time through vectorized operations, while simultaneously improving hardware utilization by eliminating gradient oscillations that prevent optimal resource allocation.

In some embodiments, the disclosed technological solution provides measurable improvements to computer system performance that address specific computational inefficiencies caused by neural network overconfidence. Experimental validation demonstrates that the tempering mechanism enables neural networks to converge at significantly higher learning rates than conventional approaches while maintaining comparable accuracy performance, resulting in substantial training time reductions and corresponding reductions in computational resource consumption and energy usage. The hardware-optimized implementation achieves these improvements while adding minimal computational overhead through efficient vectorized SIMD operations.

Accordingly, the inventor has conceived and reduced to practice, a system and method for neural network confidence regularization via tempering factor to improve classification performance on tabular data.

According to a preferred embodiment of the invention, a system for training a neural network comprises a computer with one or more processors and memory containing programming instructions that cause the processor to receive structured data records in tabular format from a database. The system performs data transformation based on data type, where binary data transforms to zeros and ones, categorical data transforms to numerical indices, and continuous data is scaled to values between zero and one. Date data is specifically transformed into separate numerical values for year, month, and day to capture temporal patterns effectively.

According to a preferred embodiment of the invention, the system constructs tensor representations for each transformed data type and combines binary tensor and categorical tensor representations to generate a unified indexing matrix for embedding vector lookup. Upon receiving lookup requests, the system retrieves embedding vectors from this unified indexing matrix, enabling efficient representation of both binary and categorical features in a common embedding space.

According to a preferred embodiment of the invention, the system calculates several key metrics: a masked sum of binary feature ones, a total sum of squashed embedding vector norms in categorical embeddings, and a total sum of continuous feature values. These metrics are combined to generate a total unweighted sum that represents the aggregate influence of all features present in the data instance.

The disclosed implementation computes the length (L2 Norm) of each individual embedding vector and then applies a sigmoid function to squash it. This measures the "magnitude" of each embedding's signal, not relationships between embeddings while the sigmoid prevents large embeddings from dominating the sum by mapping all values to a range of [0,1]

According to a preferred embodiment of the invention, a tempering factor is calculated by applying a sequence of operations to the total unweighted sum: subtraction of one, multiplication by a tempering parameter, and addition of one. The value of the tempering parameter is indicative of the strength of the tempering mechanism and can be optimized during model training. The tempering factor equals one when the unweighted sum of features equals one, providing a baseline calibration point.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
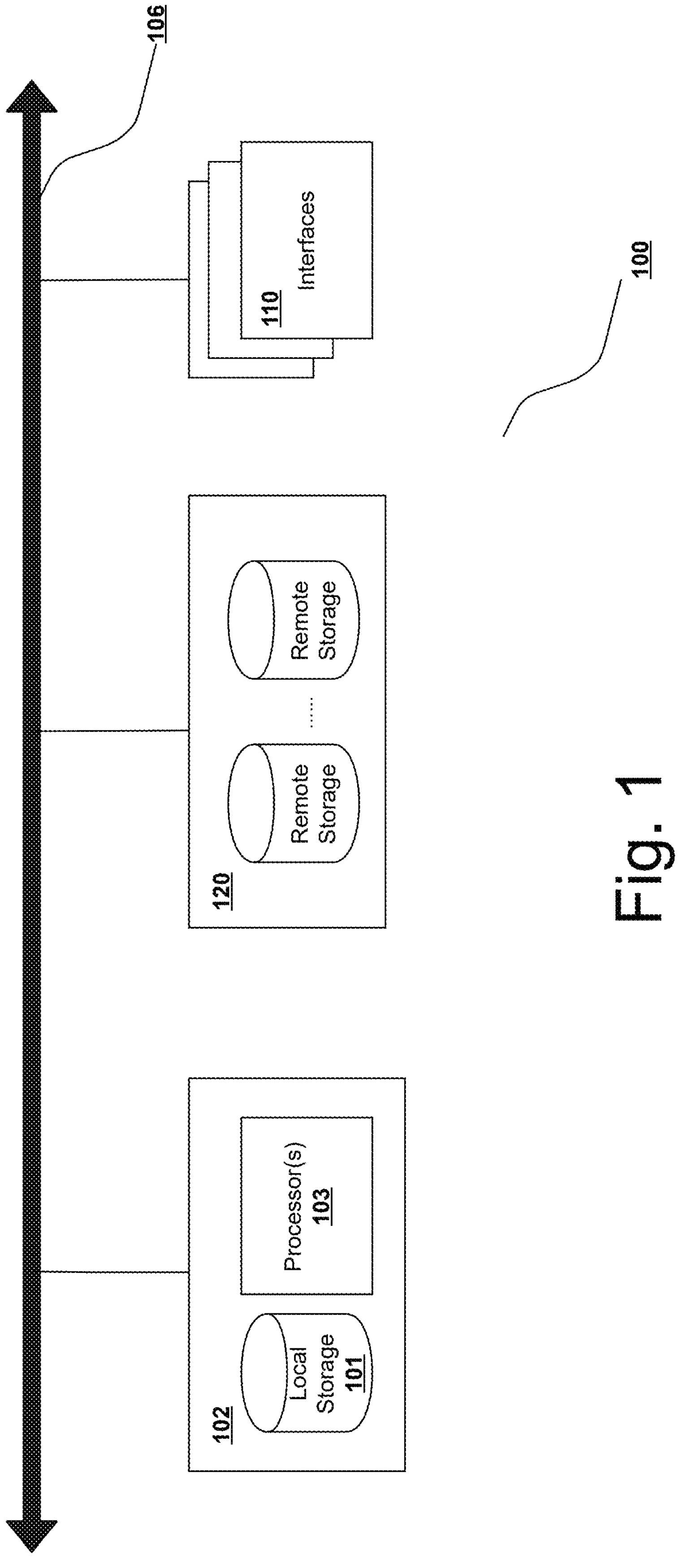
FIG. 1 is a block diagram illustrating an exemplary hardware architecture of a computing device used in an embodiment of the invention.

One or more different inventions may be described in the present application. Further, for one or more of the inventions described herein, numerous alternative embodiments may be described; it should be appreciated that these are presented for illustrative purposes only and are not limiting the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical, and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. On the contrary, a variety of optional components may be described to illustrate a wide variety of possible embodiments of one or more of the inventions and to fully illustrate one or more aspects of the inventions. Similarly, although process steps, method steps, algorithms, or the like may be described in sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of the described processes may be performed in any practical order. Further, some steps may be performed simultaneously despite being described or implied as occurring non-simultaneously (e.g., because one step is described after the other step). Moreover, the illustration of a process by its depiction in a drawing does not imply that the illustrated process is exclusive to other variations and modifications thereto, does not imply that the illustrated process or any of its steps are necessary to one or more of the inventions(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of more than one device or article.

The functionality or features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code that include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, the following terms shall have the following meanings:

"Tempering" refers to the process of dynamically adjusting neural network confidence by scaling intermediate outputs using a mathematically derived factor that increases proportionally with the quantity of input signals.

"Confidence" in the context of neural networks refers specifically to the magnitude of predicted probability values output by the neural networks model's final layer, where values closer to 1.0 indicate higher confidence in a positive classification.

"Unweighted sum" refers to the total quantity of active features present in an input instance, calculated as the sum of binary feature counts, categorical embedding magnitudes, and normalized continuous feature values, without applying learned weights.

Binary feature count is count of binary features with value 1 (true/present)

Categorical embedding magnitudes refers to the sum of L2 norms of categorical embedding vectors, each passed through a sigmoid activation function to prevent dominance by large embeddings Normalized continuous feature values are the sum of all continuous features scaled to the range [0,1]

The term "unweighted" indicates this sum reflects the raw quantity of input evidence present in the data, independent of any learned neural network parameters or feature importance weights.

"Masked sum of ones" refers to the count of binary features with value 1 (true) in an input instance, representing the number of binary indicators present in that instance.

"Tempering factor", in some embodiments, refers to the scaling value calculated as $1+A\times(\text{unweighted sum}-1)$, where A is the tempering parameter, used to regulate neural network confidence. The tempering factor equals 1 when the unweighted sum equals 1, and increases linearly as more features become active.

"Embedding magnitude", in some embodiments, refers to the L2 norm (Euclidean norm) of individual categorical embedding vectors, calculated as the square root of the sum of squared vector components: $\|v\|_2=\sqrt{(v_1^2+v_2^2+\ldots+v_n^2)}$, where v is an embedding vector with n-dimensional components. Each calculated L2 norm is then passed through a sigmoid activation function $\sigma(x)=1/(1+e^{-x})$ to map the magnitude to the range [0,1], preventing large embedding vectors from dominating the unweighted sum calculation. This approach measures the individual "signal strength" of each embedding rather than relationships between different embeddings.

Technical Parameter Selection and Measurement"

In some embodiments, the tempering parameter (A) is selected using a systematic methodology that considers application-specific requirements and data characteristics. For life-critical applications such as medical diagnosis or safety monitoring where false negatives carry catastrophic consequences, the tempering parameter typically ranges from 0.05 to 0.10 to maintain high sensitivity. For high-stakes decision-making applications such as financial fraud detection or insurance claims processing where false positives incur significant costs, the tempering parameter may range from 0.15 to 0.25 to reduce overconfident misclassifications. In some implementations, the initial tempering parameter value is adjusted based on dataset characteristics, with increases of 0.02 to 0.05 applied when feature density exceeds 100 features, increases of 0.03 applied when feature correlation coefficients exceed 0.7, and decreases of 0.02 applied for sparse feature spaces where less than 50% of features are typically active. The final tempering parameter value may be validated using cross-validation techniques to ensure calibration error stability within ±0.005 across different data splits.

In some embodiments, the memory subsystem comprises high-performance RAM operating at sustained memory bandwidth of at least 400 GB/s as measured by standard memory benchmarking protocols such as the STREAM benchmark triad operations. In certain implementations, the memory may comprise DDR4 RAM operating at minimum 3200 MHZ with CAS latency not exceeding 16 clock cycles, DDR5 RAM operating at minimum 4800 MHZ with CAS latency not exceeding 40 clock cycles, or High Bandwidth Memory (HBM) with interface width of at least 1024 bits providing memory bandwidth exceeding 500 GB/s. Memory architecture may achieve embedding vector lookup throughput exceeding 10 million lookups per second with average memory access latency not exceeding 200 nanoseconds for tensor data retrieval. In some implementations, the memory subsystem includes L3 cache of at least 32 MB for tensor storage and supports 4-way memory interleaving for parallel access patterns.

In some embodiments, the vector processing units comprise SIMD instruction sets supporting minimum 256-bit vector registers capable of executing at least 8 parallel floating-point operations per clock cycle. The vector processing units may implement AVX-512 instruction sets with Vector Neural Network Instructions (VNNI) supporting 512-bit vector operations, or ARM Scalable Vector Extension (SVE) with variable width ranging from 128 to 2048 bits. In certain implementations, the vector processing units achieve computational throughput of at least 1 TFLOPS for matrix multiplication operations and maintain SIMD lane utilization exceeding 90% during tempering factor calculations. The specialized tensor instructions may include support for 4×4 or 8×8, or any sized matrix multiplication blocks, vectorized reduction operations for sum and L2-norm calculations, and gather/scatter operations for sparse tensor access patterns. In some embodiments, GPU implementations may utilize tensor cores capable of mixed-precision matrix acceleration with throughput exceeding 100 TOPS.

In some embodiments, calibration error is measured using Expected Calibration Error (ECE) methodology that partitions prediction confidence scores into equally spaced bins and calculates the weighted average of absolute differences between bin accuracy and bin confidence. The ECE calculation typically employs 10 equally spaced confidence intervals from 0.0 to 1.0, though some implementations may use 15 bins for higher resolution measurement. Each bin preferably contains at least 100 samples for statistical significance, and the total test set comprises a minimum of 10,000 samples to ensure a reliable ECE estimation. In some implementations, the ECE measurement is validated using bootstrap sampling with 1000 iterations to establish 95% confidence intervals, with reliable measurements characterized by confidence interval widths less than 0.01. Alternative calibration metrics may include Maximum Calibration Error (MCE) measuring the worst-case calibration gap across all bins, or Brier score improvements measuring the mean squared difference between predicted probabilities and actual outcomes.

In some embodiments, the enhanced learning rate capability is determined through controlled comparison with baseline neural networks having identical architecture but lacking the tempering mechanism. The baseline learning rate is established as the maximum learning rate that achieves stable convergence without divergence in the untempered network, typically determined through grid search over values ranging from 1e-5 to 1e-1 using standard optimization protocols such as Adam optimizer with $\beta_1=0.9$, $\beta_2=0.999$, and $\varepsilon=1e-8$. Convergence is defined as achieving loss reduction greater than 90% within 1000 epochs with no loss oscillations exceeding 10% in the final 100 epochs of training. In some implementations, the tempering-enabled networks demonstrate stable convergence at learning rates 2 to 5 times higher than the established baseline, with convergence verified across multiple random seed initializations to ensure reproducibility. The enhanced learning rate capability may result in 40-60% reduction in training epochs required to reach 90% of final performance and 30-50% reduction in total training time while maintaining accuracy within 2% of baseline performance.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

In certain embodiments, the vector processing units comprise hybrid processor architectures that integrate both central processing unit (CPU) cores and graphics processing unit (GPU) cores on a single chip or within a unified processing system. These combined processors, such as system-on-chip (SoC) designs or integrated CPU-GPU architectures, enable seamless coordination between sequential processing tasks handled by CPU cores and parallel tensor operations executed by GPU cores. The tempering factor calculations benefit from this hybrid architecture by utilizing CPU cores for control flow and decision logic (such as determining which tempering parameters to apply based on data characteristics) while simultaneously leveraging GPU cores for the vectorized mathematical operations on large batches of unweighted sum calculations. The unified memory architecture in combined processors allows both CPU and GPU components to access the same tensor storage and embedding cache without expensive data transfers between separate memory spaces. This integrated approach optimizes the tempering mechanism by executing preprocessing steps on CPU cores while performing the bulk parallel computations for tempering factor generation on GPU cores, with shared memory access enabling efficient data flow between the different processing components within the same silicon package.

The vector processing units may be implemented using Accelerated Processing Units (APUs) or processors with integrated graphics that combine traditional CPU functionality with parallel processing capabilities on a single die. These combined processors execute the tempering factor calculations by distributing workload between general-purpose CPU cores for sequential operations and specialized compute units for parallel vector operations, sharing a unified memory controller and cache hierarchy that eliminates bottlenecks associated with discrete processing units.

In some embodiments, the disclosed tempering mechanism is specifically implemented using computer hardware optimized for machine learning workloads to solve the technical problem of neural network overconfidence through technological means rather than abstract mathematical manipulation. The vector processing units implement specialized instruction sets including Advanced Vector Extensions (AVX-512) with Vector Neural Network Instructions (VNNI) or ARM Scalable Vector Extensions (SVE) that enable Single Instruction, Multiple Data (SIMD) parallel processing of tempering calculations across multiple data instances simultaneously. This hardware integration is essential because the tempering factor calculation, when implemented using sequential processing, would create computational bottlenecks that negate the learning rate improvements and fail to address the underlying computational efficiency problems.

In certain implementations, the parallel SIMD implementation ensures that tempering overhead remains a minimal fraction of total processing time while providing the confidence regulation necessary for enhanced learning rates and improved hardware utilization. The memory architecture implements hardware-specific optimizations including dedicated cache allocation for embedding vector lookups, high-bandwidth memory interfaces that sustain the data throughput required for real-time tempering calculations, and cache coherency protocols specifically optimized for the access patterns generated by embedding lookups with high cache hit rates. These hardware components work together to solve the specific computer problem of neural network overconfidence while maximizing utilization of expensive parallel processing hardware such as GPUs and TPUs that would otherwise be underutilized due to training instabilities.

Software/hardware hybrid implementations of at least some of the embodiments disclosed herein may be implemented on a programmable network-resident machine (which should be understood to include intermittently connected network-aware machines) selectively activated or reconfigured by computer programming instructions stored in memory. Such network devices may have multiple network interfaces that may be configured or designed to utilize different types of network communication protocols. A general architecture for some of these machines may be described herein to illustrate one or more exemplary means by which a given unit of functionality may be implemented. According to specific embodiments, at least some of the features or functionalities of the various embodiments disclosed herein may be implemented on one or more specifically designed computers associated with one or more networks, such as, for example, an end-user computer system, a client computer, a network server or other server system, a mobile computing device (e.g., tablet computing device, mobile phone, smartphone, laptop, or other appropriate computing devices), a consumer electronic device, a music player, or any other suitable electronic device, router, switch, or other suitable devices, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software-or hardware-based instructions according to one or more programs stored in memory. Computing device 100 may be adapted to communicate with a plurality of other computing devices, such as clients or servers, over communications networks such as a wide area network, a metropolitan area network, a local area network, a wireless network, the Internet, or any other network, using known protocols for such communication, whether wireless or wired. The neural network training system leverages specialized computer hardware optimized for machine learning workloads. The system employs vector processing units that execute Single Instruction, Multiple Data (SIMD) operations to perform parallel calculations on tensor elements simultaneously, significantly accelerating the mathematical operations required for embedding lookups, feature sum calculations, and tempering factor computations. The memory architecture includes high-speed RAM specifically allocated for tensor storage, enabling rapid access to multidimensional data structures during neural network processing. A dedicated cache system optimizes embedding vector lookups by maintaining frequently accessed categorical and binary embeddings in fast-access memory, reducing latency during the unified indexing matrix operations. The vector processing units coordinate with the specialized memory architecture to execute the tempering mechanism calculations in parallel, where multiple feature sums and embedding magnitude calculations occur simultaneously across different data instances within a training batch. The tensor operations are optimized through hardware-specific implementations that exploit the parallel structure of multi-dimensional arrays. Vector processing units include specialized instruction sets for tensor multiplication, addition, and reshaping operations that process multiple tensor elements in a single clock cycle. The dedicated cache for embedding vector lookups implements a hierarchical memory structure with L1 cache specifically reserved for frequently accessed embedding vectors, reducing memory access latency from standard RAM retrieval times to cache-speed access. This caching architecture recognizes that embedding lookups often exhibit temporal locality, where the same categorical values appear repeatedly within training batches, making dedicated cache allocation highly effective for performance optimization.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

In embodiments optimized for neural network processing, processors 103 may include vector processing units (VPUs) specifically designed for parallel tensor operations. These vector processing units implement Single Instruction, Multiple Data (SIMD) instruction sets that enable simultaneous processing of multiple tensor elements within a single processor cycle. For example, Advanced Vector Extensions (AVX) instruction sets allow processors to perform parallel operations on 256-bit or 512-bit wide data vectors, significantly accelerating the mathematical computations required for tempering factor calculations and embedding vector processing.

The vector processing units are particularly advantageous for the unweighted sum calculations described herein, as they can simultaneously compute L2 norms across multiple embedding vectors using vectorized square root and summation operations. Similarly, the element-wise division required for applying tempering factors to intermediate neural network outputs benefits from SIMD parallelization, where multiple activation values can be divided by their corresponding tempering factors in a single instruction cycle.

In GPU-accelerated embodiments, processors 103 may comprise graphics processing units with thousands of parallel cores optimized for tensor operations. These GPU implementations utilize CUDA or OpenCL instruction sets to perform massively parallel tempering calculations across large batches of input data, enabling real-time processing of high-throughput data streams.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interface 110 is provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (Wi-Fi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interface 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control the execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art about personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid-state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
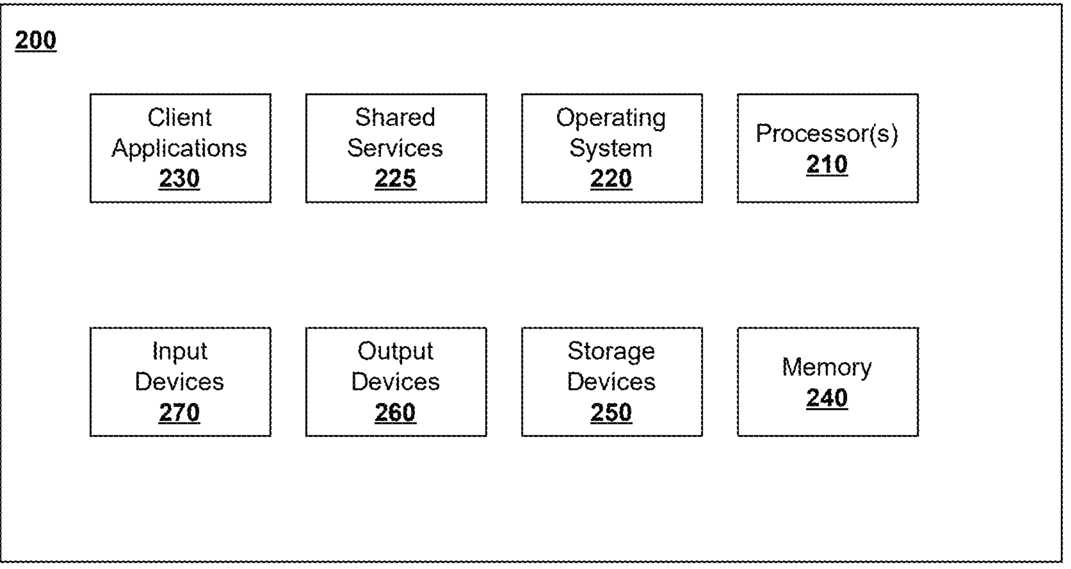
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carries out one or more functions or applications of embodiments of the invention, such as, a client application 230. Processors 210 may carry out computing instructions under the control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example, to run the software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
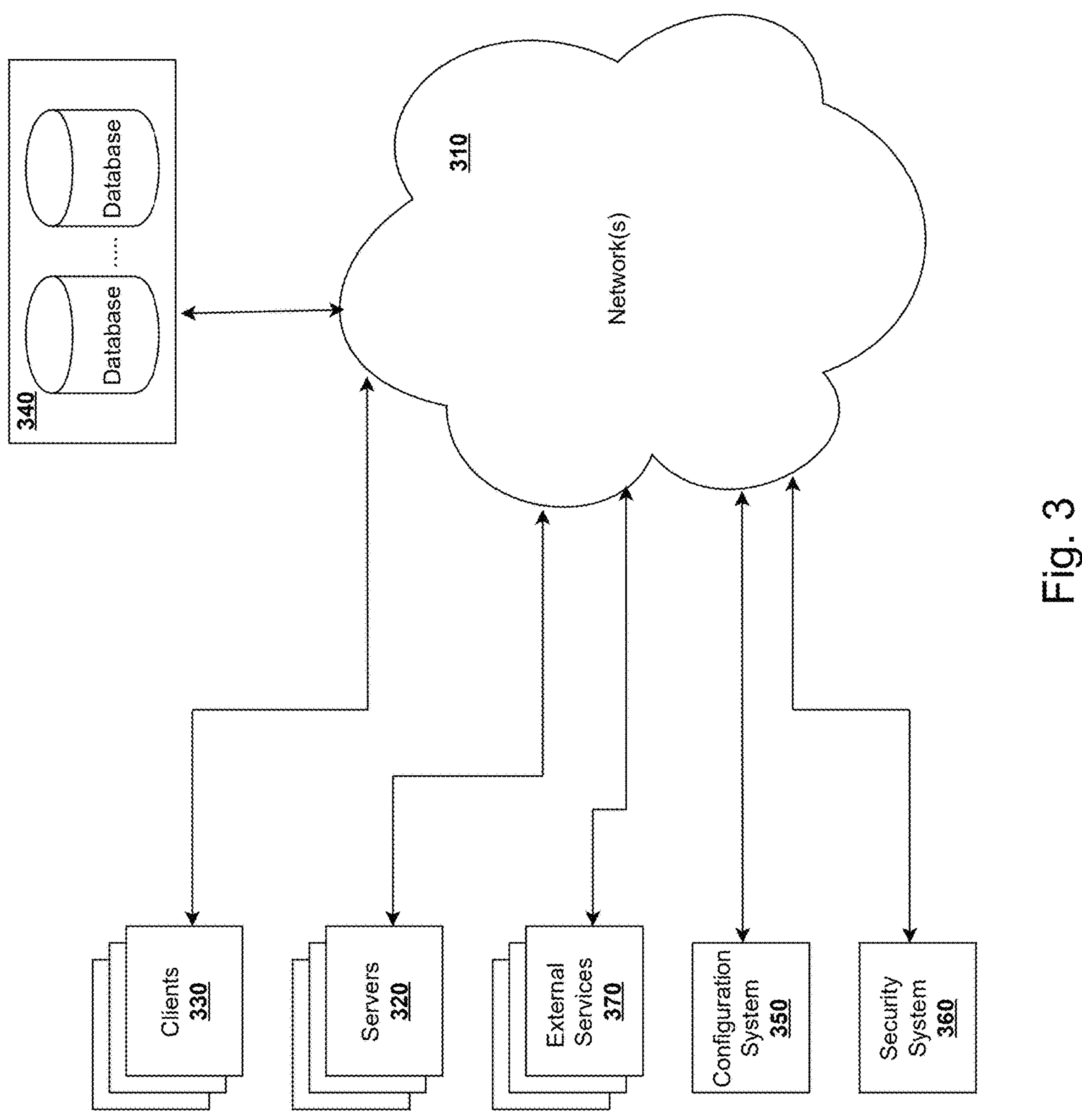
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of particular enterprises or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google Bigtable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database," it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each is generally associated with any IT or web systems. It should be understood by one having ordinary skill in the art that any configuration or security subsystems known in the art now or in the future may be used in conjunction with embodiments of the invention without limitation unless a specific security 360 or configuration system 350 or approach is specifically required by the description of any specific embodiment.

Figure 4:
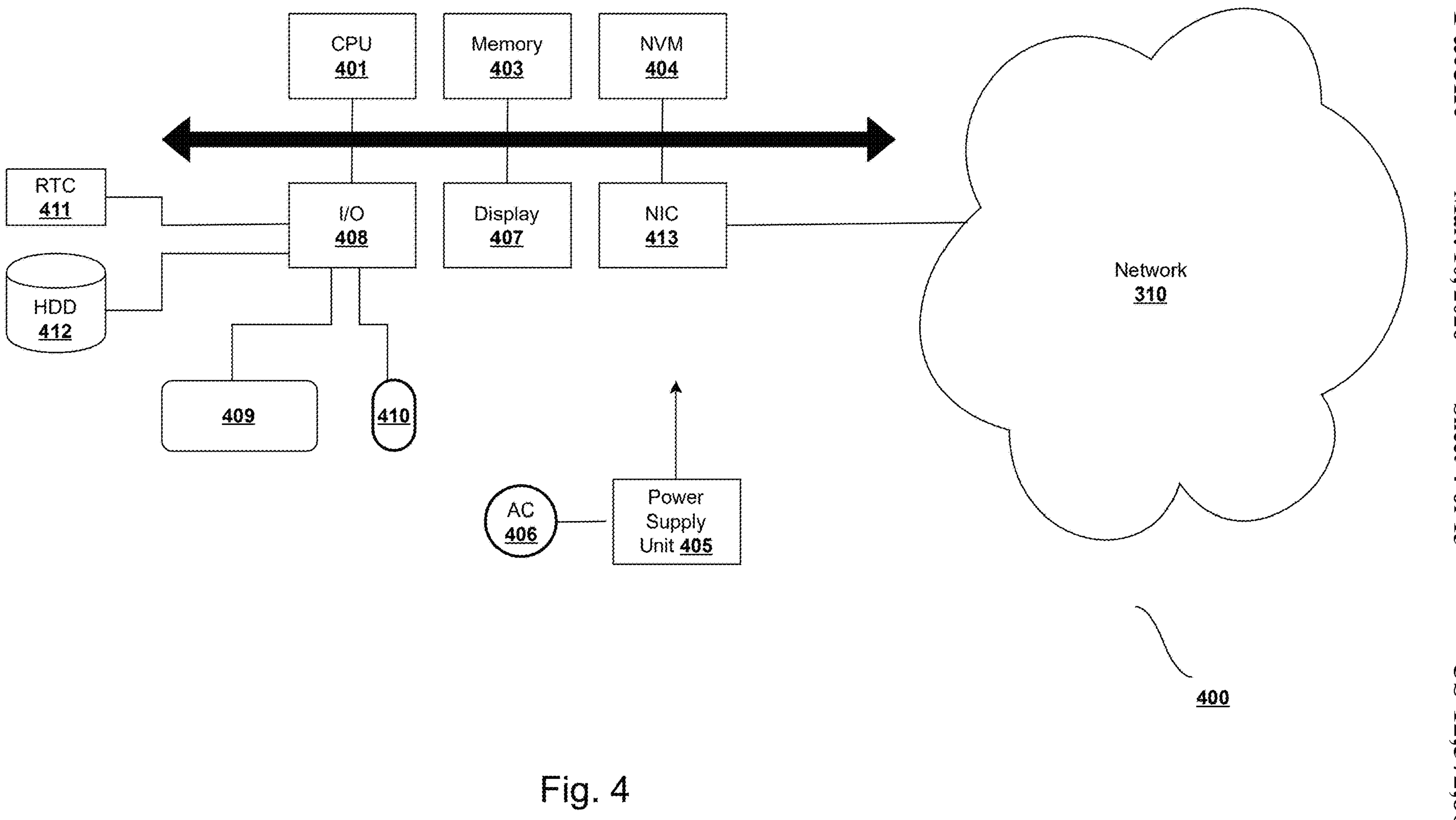
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, non-volatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which may or may not have connections to the Internet. Also shown as part of system 400 is power supply unit 405 connected, in this example, to ac supply 406. Not shown are batteries that could be present, and many other devices and modifications that are well known but do not apply to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

The tempering-enhanced neural network system addresses computational inefficiencies that arise specifically in computer systems when neural networks exhibit overconfidence during training on tabular data. In some embodiments, the system architecture is designed to solve these computer-specific problems through hardware-software co-optimization that leverages parallel processing capabilities while minimizing computational overhead. The vector processing units with SIMD instruction sets enable parallel execution of tempering calculations across multiple training examples simultaneously, preventing the computational bottlenecks that would occur with sequential implementation and ensuring that confidence regulation adds negligible processing overhead while enabling significant improvements in learning rate capabilities and hardware utilization efficiency.

Figure 5:
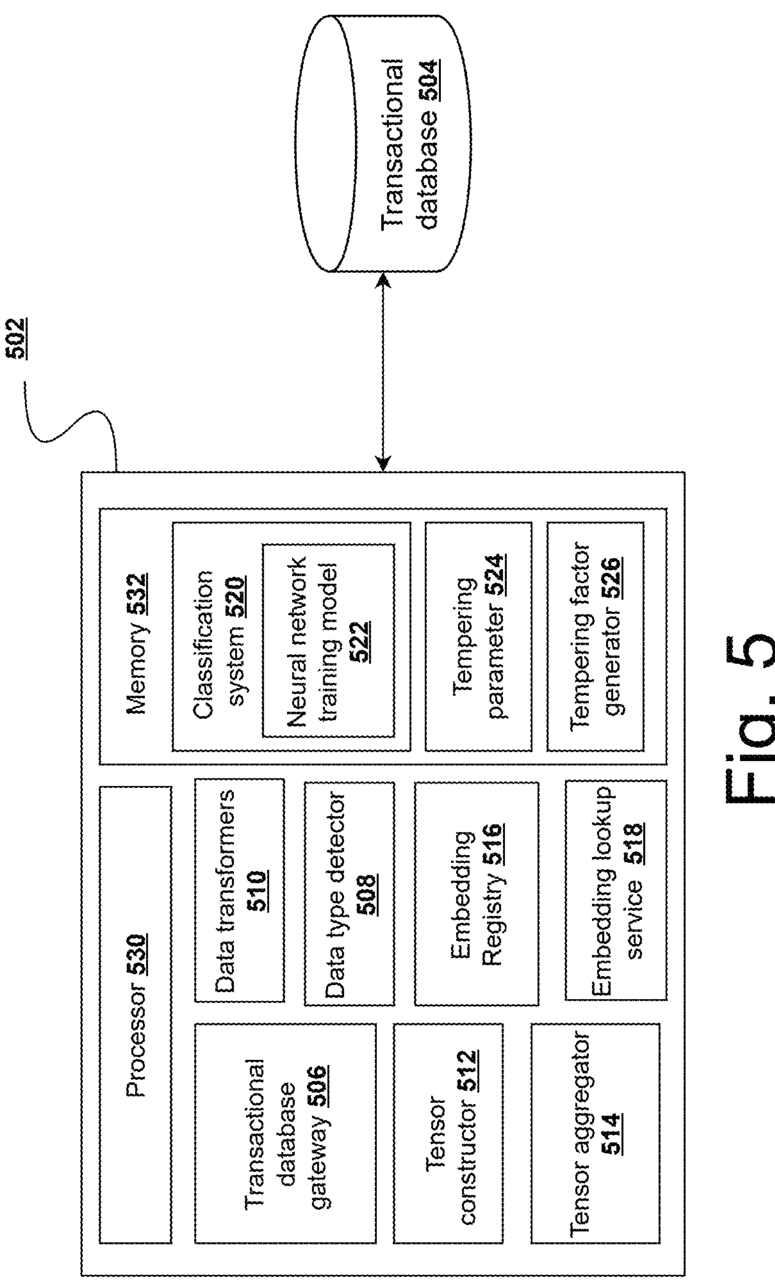
FIG. 5 is a block diagram illustrating an exemplary architecture of a computing system 502 for implementing tempering in neural networks, according to an embodiment of the invention.

FIG. 5 is a block diagram illustrating an exemplary architecture of a computing system for implementing tempering in neural networks. At the core of the system, computer 502 houses the primary processing components and memory architecture necessary for tempering operations. Computer 502 may include a high-performance processor 530 that executes the neural network algorithms and handles the mathematical calculations required for the tempering process. Processor 530 may include multiple cores optimized for parallel computing tasks and machine learning workloads, allowing for efficient processing of tensors and matrix operations. In an embodiment optimized for neural network tempering operations, processor 530 comprises vector processing units with SIMD capabilities that enable parallel execution of mathematical operations across multiple data elements. The vector processing units are specifically configured to accelerate tensor operations including L2 norm calculations for embedding vectors, parallel summation operations for unweighted sum computation, and vectorized division operations for applying tempering factors to intermediate neural network outputs. This parallel processing architecture reduces the computational overhead of tempering calculations to less than 5% of total neural network processing time, enabling real-time processing of streaming tabular data with minimal latency impact.

Memory 532 of computer 502 contains several specialized memory components including high-speed RAM for temporary storage of tensor data during processing, a dedicated model memory that stores neural network weights and parameters, a cache memory for frequently accessed embedding vectors and transformation matrices, and a non-volatile storage for persisting trained models and configuration parameters. Memory 532 may be optimized for the large matrix operations required for embedding lookups and tensor manipulations, with sufficient capacity to handle batched processing of multiple data instances simultaneously.

In an embodiment, computer 502 may connect to a transactional database 504 that stores structured data records in tabular format. Examples of structured data records may include, but are not limited to, healthcare patient records, e-commerce purchase data, banking transactions record, and insurance claims data.

In an embodiment, transactional database 504 may be a storage system for input data that will be processed by the neural network training model 522. Transactional database 504 may be optimized for a high read throughput as neural network training model 522 needs to process large number of records quickly. Further, transactional database 504 may incorporate different types of data. (binary, categorical, continuous, date).

In an embodiment, transactional database 504 may be distributed across multiple physical storage devices for improved performance and reliability. Access to this transactional database 504 may be managed through a transactional database gateway 506, which serves as an interface layer responsible for retrieving, editing, deleting, and storing data in transaction database. Transactional database gateway 506 facilitates secure and efficient data transfer operations between the database and other system components, implementing database connection pooling and query optimization techniques.

In an embodiment, data type detector 508 receives data from transactional database gateway 506 and analyzes incoming data to determine its structural type (binary, categorical, date-formatted, or continuous). Data type detector 508 may be pattern recognition algorithms stored in memory 532 to accurately identify data types even when they are not explicitly declared in the source. Once the data type is determined, computer 502 may route the data to appropriate data transformers 510, which convert respective data type into standardized formats suitable for neural network processing. These data transformers 510 may include specialized modules for binary transformation, categorical transformation, date transformation, and continuous scaling transformation.

In an embodiment, tensor constructor 512 may build multidimensional tensor representations of the transformed data, organizing binary, categorical, and continuous data into appropriate tensor structures. Tensor constructor 512 may allocate memory buffers within computers 502 memory architecture to efficiently store these tensor structures. A tensor aggregator 514 may combine these tensors and calculate various mathematical aggregations necessary for the tempering process, utilizing optimized linear algebra libraries that leverage the processor's vector computation capabilities.

In an embodiment, embedding registry 516 serves as a centralized repository that maintains the mapping between feature indices and their corresponding embedding vectors. Embedding registry 516 stores vector representations of categorical and binary variables in a structured memory format that enables fast lookups, and embedding lookup service 518 may retrieve appropriate embedding vectors when needed by the neural network, utilizing memory-efficient pointer operations rather than copying large data structures. In an embodiment, embedding lookup service 518 may retrieve relevant embedding vectors In an embodiment, classification system 520 utilizes the trained neural network training model 522 to make predictions on new data, loading only the necessary components of neural network training model 522 into active memory to optimize performance. Neural network training model 522 is stored as a computational graph in memory 532, with weight matrices and activation functions organized to minimize memory transfers during forward and backward propagation. The entire system architecture is designed for scalability, with memory management routines that may expand, or contract resource allocation based on the current processing demands and dataset sizes.

In an embodiment, computer 502 may calculate feature sums by analyzing the binary, categorical, and continuous tensors. These calculations include determining masked sums of binary values, magnitude of categorical embeddings, and sums of continuous values. These feature sums are combined to generate the total unweighted sum, which represents the aggregate influence of all features present in the data. This unweighted sum is then used to calculate the tempering factor, which serves as a scaling factor to regulate the neural network's confidence. Tempering factor is calculated based on the unweighted sum of input features.

In an embodiment, tempering factor generator 526 (calculation steps 823-826 in FIG. 8C) may generate a dynamic scaling factor used to calibrate the confidence of neural network outputs. An unweighted sum serves as the primary input to the tempering factor generator 526 because it provides a direct measure of the "evidence quantity" present in each input example.

Tempering factor generator 526 produces tempering factors that scale proportionally with the unweighted sum, increasing more rapidly when more signals are present. Tempering factor generator 526 generates a tempering factor that is adapted based on data patterns present in the transactional data.

Tempering parameter 524 is indicative of the strength of the tempering effect. Tempering parameter 524 is a coefficient that directly impacts how strongly the tempering mechanism reduces the neural network training model's 522 confidence.

Tempering factor may be calculated as follows: Tempering Factor=1+tempering parameter (A)×(Unweighted Sum−1).

Tempering factor may be used to modulate an intermediate output 608 of the hidden layers, effectively scaling down the confidence of predictions when multiple low-weight signals are present in the input data.

During operation, computer 502 may receive raw entity data from transactional database 504 through transactional database gateway 506, that handles data retrieval requests and connection management. The incoming data is then analyzed by data type detector 508, which categorizes each field as binary, categorical, date, or continuous, before routing it to the appropriate data transformers 510 that standardize the values into formats suitable for neural network processing. These transformed values are passed to tensor constructor 512, which builds multi-dimensional tensor representations organized by data type, while tensor aggregator 514 combines and computes mathematical summaries of these tensors.

For categorical and binary data, computer 502 may retrieve corresponding vector representations from embedding registry 516 using embedding lookup service 518, enabling the neural network to process non-numeric data effectively.

Neural network training model 522 may process these prepared tensors, applying the tempering parameter 524 and using tempering factor generator 526 to calculate scaling factors that prevent overconfidence in predictions. Classification system 520 may produce final probability outputs based on the tempered model, with the entire process executed by processor 530 and managed within memory 532 of computer 502, which efficiently allocates resources for the computational workload.

Detailed Description of Exemplary Embodiments

Figure 6:
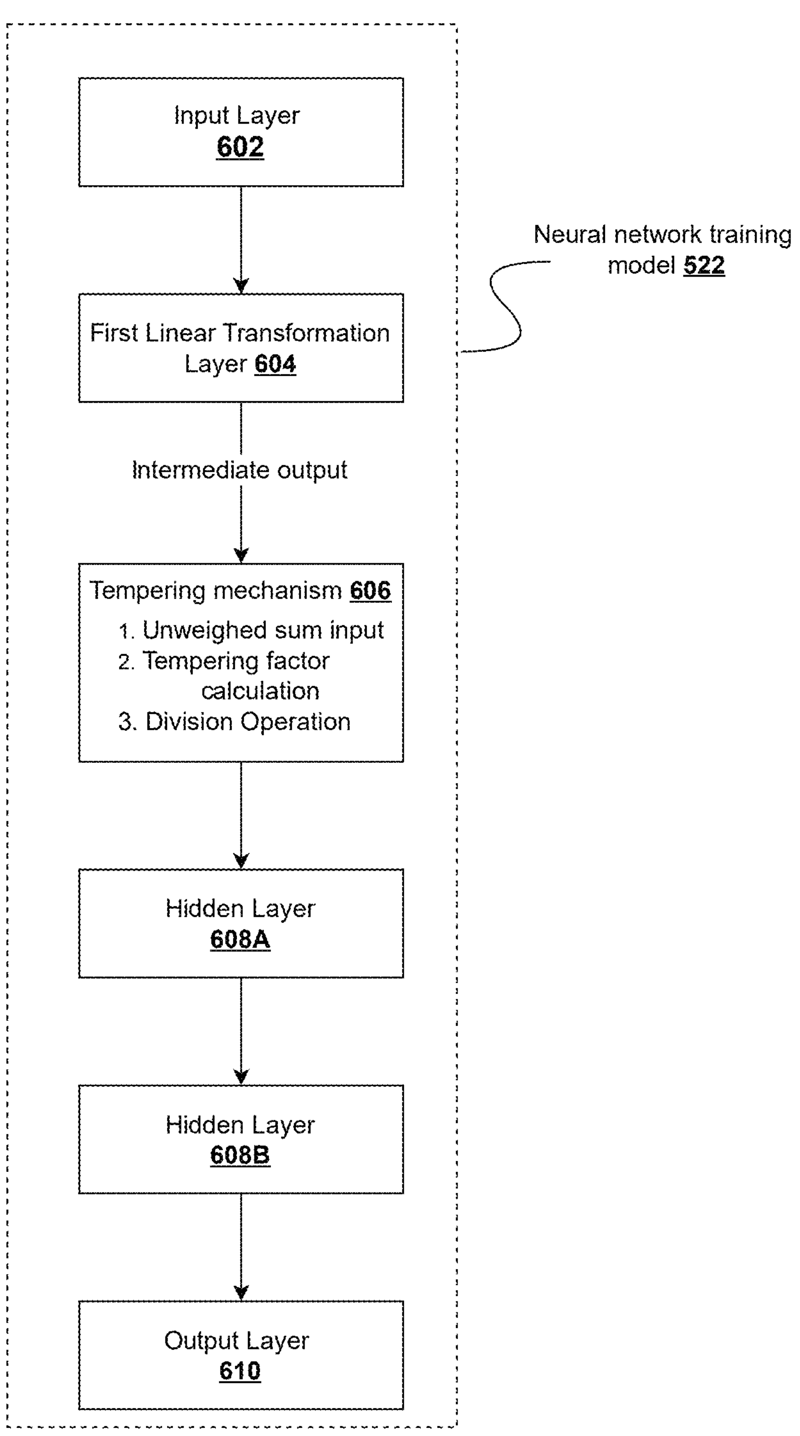
FIG. 6 is a block diagram illustrating the internal architecture of a tempering-enhanced neural network model referenced in FIG. 5, according to an embodiment of the invention.

FIG. 6 is a block diagram illustrating the internal architecture of a tempering-enhanced neural network model 522 referenced in FIG. 5. This diagram demonstrates how tempering is integrated into the neural network architecture to reduce model overconfidence on complex data.

Neural network training model 522 comprises an input layer 602 that receives tensor data from the tensor constructor 512 and embedding lookup service 518 shown in FIG. 5. The input data flows into a first linear transformation layer 604 that applies learned weight matrices to transform the input features into an intermediate representation.

Immediately following the first linear transformation layer 604, a tempering mechanism 606 is applied. In some embodiments, tempering mechanism 606 is positioned as a single confidence gate immediately following the first linear transformation 604. Hence, the tempering mechanism 606 acts as an entrance filter rather than a distributed regularization mechanism. In some cases, tempering mechanism 606 may be repeated at each layer.

Tempering mechanism 606 includes computation of the unweighted sum (calculated from binary, categorical, and continuous feature aggregations) feds into a tempering factor generator 526. The unweighted sum S is calculated as:

S=Binary_Count+Embedding_Magnitudes+Continuous_Sum, where Binary_Count=Σ(binary_features==1)

Embedding_Magnitudes=Σ(sigmoid(||embedding_i||_2)) for all categorical embeddings Continuous_Sum=Σ(normalized_continuous_features)

The tempering factor T may be computed using: T=1+A×(Unweighted Sum−1) When sum ~0, T defaults near 1 (preserves base output)

The intermediate output from layer 604 is divided by the tempering factor, creating a confidence-regulated signal.

Tempered_Output=First_Linear_Output÷T

This tempered intermediate output (then passes through additional hidden layer(s) 608A and 608B, which apply transformations including normalization, linear transformations, and non-linear activations to the input data. Each hidden layer contains nodes that learn to recognize specific patterns in the data through adjustable weights that are optimized during training.

The final output layer 610 produces calibrated probability distributions for classification tasks. Unlike traditional neural networks that may exhibit overconfidence when processing multiple weak signals, this architecture dynamically adjusts confidence based on feature density.

This neural network training model implementation directly corresponds to the classification system 520 in FIG. 5, with the tempering parameter 524 and tempering factor generator 526.

Figure 7:
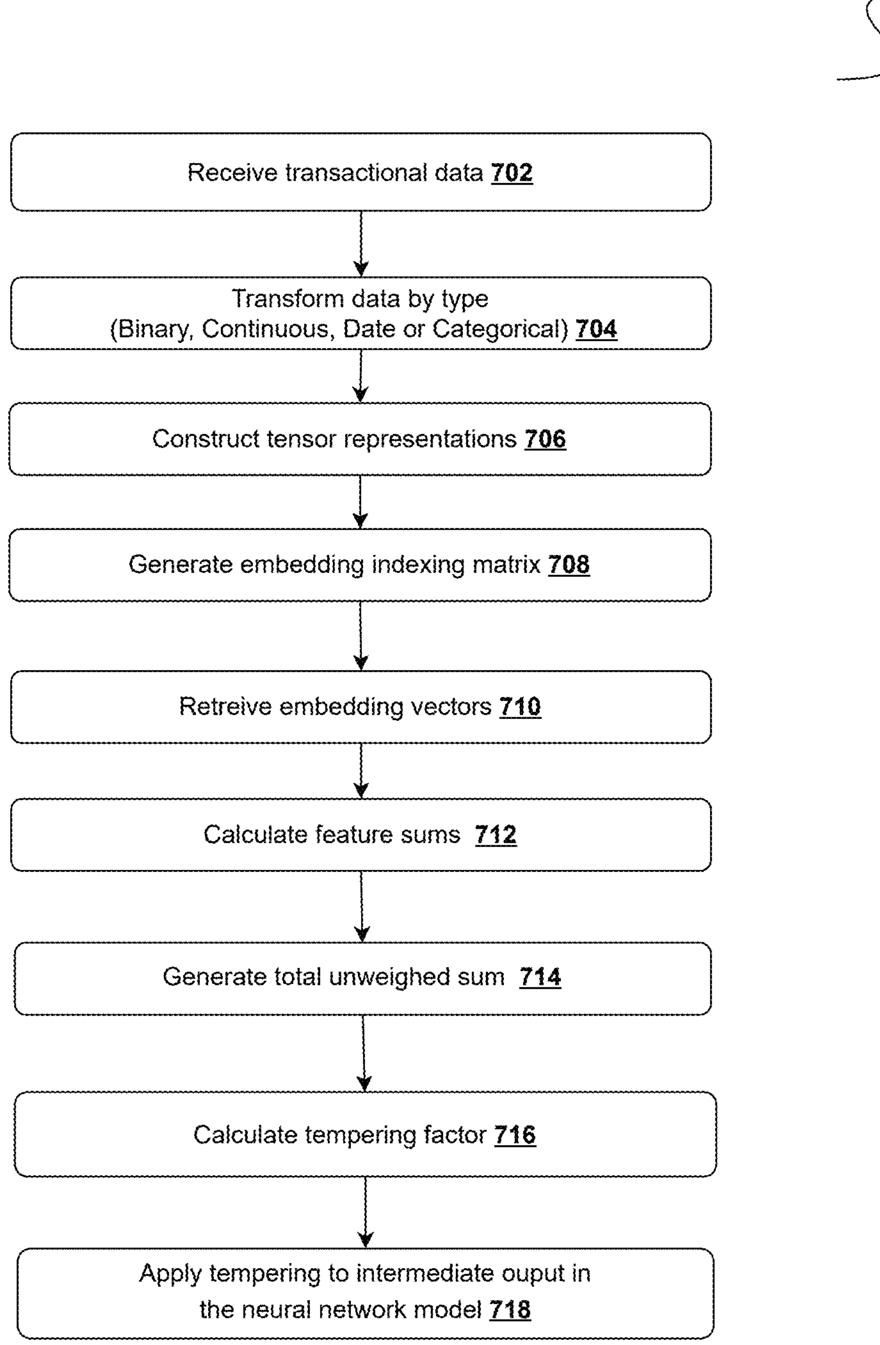
FIG. 7 is a flowchart illustrating a method for implementing tempering in neural network classification.

The tempering mechanism provides several technical advantages over traditional neural network architectures. First, it enables the use of higher learning rates during training, as the tempering factor prevents overconfident gradient updates that can lead to oscillation or divergence. Second, it provides dynamic regularization without additional complexity and reduces overfitting on training data. Third, it produces better-calibrated probability outputs that more accurately reflect true classification uncertainty, which is critical for downstream decision-making processes. Fourth, it enables neural networks to outperform traditional machine learning algorithms on complex tabular data problems that involve non-linear relationships between features FIG. 7 is a flowchart illustrating method 700 for implementing tempering in neural network classification. The steps of method 700 provides a functional overview of the steps performed computer 502 to apply tempering to neural network outputs.

In some implementations, method 700 may include more or fewer blocks than are shown. In some implementations, one or more of the blocks of a method may, at certain times, be ongoing and/or may repeat. In some implementations, blocks of the method 700 may be combined. The method 700 depicted in FIG. 7 may be implemented in the form of executable instructions stored on a machine-readable medium and executed by the processor. Method 700 may be performed by processor 530 by executing instructions stored in memory 532.

Method 700 begins at step 702, with computer 502 receiving transactional data from transaction database through the gateway. This initial data retrieval process may employ a buffered querying mechanism that optimizes memory usage when handling large datasets. Transaction database gateway 702 may implement connection pooling to maintain persistent database connections, reducing latency and overhead.

At step 704, data type detector 508 may identify the data type and data transformers 510 transform the data by type, applying appropriate transformations to binary, categorical, date, and continuous data types. Each transformation converts the original data into a standardized format suitable for neural network processing. For binary data, the transformer normalizes varied representations (Boolean values, 0/1 integers, "yes"/"no" strings, etc.) into consistent binary tensors. Categorical data undergoes ordinal encoding with provisions for handling previously unseen categories using a default "unknown" token. Date transformations decompose timestamps into cyclical representations using sine and cosine transformations to capture periodicity, while also extracting temporal features like day-of-week, month, and quarter.

At step 706, tensor constructor 512 may construct tensor representations of the data, organizing it into appropriate multi-dimensional structures. The tensor construction process may employ dynamic batching algorithms that optimize memory usage based on available computational resources. Binary features may be packed into bit-level tensors using efficient bit manipulation (when feasible) to reduce memory footprint. Categorical features may be arranged in sparse tensor formats. Continuous tensors may be structured with appropriate padding and masking to handle variable-length sequences.

At step 708, a unified indexing matrix may be generated by combining binary and categorical tensors and stored in embedding registry 516. A unified index space may be created across all categorical features, with binary features treated as special cases of binary categories. Unified indexing matrix may employ a sparse representation format to efficiently handle high-cardinality categorical features. Embedding registry 516 serves as a lookup mechanism for embedding vectors. Embedding registry 516 implements a hierarchical caching mechanism with multiple tiers (L1/L2/disk) to optimize lookup performance based on access patterns.

At step 710, processor 530 may retrieve embedding vectors from unified indexing matrix. The embedding factors represent the latent features of categorical and binary variables.

The embedding lookup operation is optimized through vectorized gather operations that maximize cache coherence and CPU SIMD instruction utilization. For GPU-accelerated environments, the embeddings may be organized to minimize transfer overhead and maximize parallel lookup efficiency.

At step 712, processor 530 may calculate feature sum by analyzing the binary, categorical, and continuous tensors. These calculations include determining masked sums of binary values, magnitude of categorical embeddings, and sums of continuous values. For binary values, the system employs efficient bitwise operations to count active signals when applicable. Categorical embedding magnitudes may be computed by calculating the L2 norm of each individual embedding vector and applying sigmoid activation to prevent large embeddings from dominating the sum. For continuous values, processor 530 employs numerically stable summation algorithms (Kahan summation or pairwise summation) to maintain precision even with large feature sets. These calculations are vectorized using SIMD instructions and can be offloaded to GPU accelerators when available, with appropriate memory transfer optimizations.

At step 714, these feature sums may be combined to generate a total unweighted sum, which represents the aggregate influence of all features present in the data. This unweighted sum calculation applies feature-type-specific normalization factors to ensure balanced contributions across binary, categorical, and continuous domains. The system employs adaptive weighting based on statistical properties of each feature type across the dataset. For signals from sparse feature spaces, the sum calculation includes compensation factors to account for the inherent differences in information density compared to dense feature spaces. In an embodiment, Total_Unweighted_Sum=Binary_Sum+Embedding_Magnitude_Sum+Continuous_Sum A key advantage of using the total unweighted sum as the foundation for the tempering factor is its interpretability. The unweighted sum directly correlates with the quantity of information or 'evidence' present in the input data, making the tempering mechanism transparent and explainable. Furthermore, because the tempering factor scales proportionally with the evidence quantity, the system naturally adapts to varying data densities without requiring manual tuning. This adaptive behavior ensures consistent performance across diverse datasets with different feature distributions and sparsity patterns At step 716, the unweighted sum is used for the calculation of the tempering factor, which serves as a scaling factor to regulate the neural network's confidence.

In an embodiment, the mathematical foundation for the tempering mechanism is derived from principles of information theory and Bayesian statistics. The tempering factor T can be expressed as: $T=1+A\times(S-1)$ where S is the unweighted sum of features and A is the tempering parameter. This tempering parameter can be learned through gradient descent or can remain fixed if non-learnable. This formulation has several important theoretical properties: When S=1 (only one feature is present), T=1, meaning no tempering is applied. This aligns with the observation that overconfidence typically emerges from the accumulation of multiple weak signals rather than from individual features. When few or no features are present (unweighted sum ~ 0), minimal tempering is applied (t close to 1), the tempering factor defaults to 1, ensuring the model's base output remains unchanged rather than being inappropriately scaled. This preserves the base network output rather than zeroing it out.

As S increases, T increases linearly, ensuring that the tempering effect scales proportionally with the quantity of input signals.

Since the network output is divided by T, a larger tempering factor results in stronger confidence reduction. When many weak features are present (high S), the combined confidence gets substantially reduced (divided by a large T), preventing overconfident predictions from accumulating weak signals. Parameter A may control a rate at which T increases with S, allowing calibration of the tempering strength to match dataset characteristics.

From a probabilistic perspective, the tempering factor approximates a correction to the naive assumption of feature independence in the model. Neural network training model 522 may include two to four hidden layers to provide optimal results with tempering At step 718, processor 530 may apply tempering to an intermediate output of the neural network training model 522. The intermediate output may be divided by the tempering factor to produce a tempered indication. This application occurs after the base network layers have produced their activation patterns but before the final classification layer.

In traditional neural networks, confidence tends to increase with each additional feature as if features contribute independent evidence. However, in tabular data, features often exhibit correlation and redundancy. The tempering factor mathematically compensates for this by scaling the model's intermediate outputs: $O\_tempered=O\_base/T$ where O_base is the base layer intermediate output and O_tempered is the tempered output. This operation effectively reduces model's 522 confidence when many features are present, preventing the overaccumulation of confidence from correlated or weakly predictive features. The theoretical justification for this approach is further supported by calibration theory, which establishes that well-calibrated probabilities are essential for optimal decision-making under uncertainty. The tempering mechanism provides a principled approach to achieving calibration within the model architecture itself, rather than as a post-processing step.

This tempered indication better represents the true probability of classification, avoiding the overconfidence problem that can occur with traditional neural networks when processing data with many low-weight signals. The tempering mechanism dynamically adjusts its behavior based on prediction confidence, applying stronger tempering to high-confidence predictions and lesser tempering to uncertain predictions.

With tempering, model's 522 confidence is reduced. More importantly, model's 522 learns to reduce its confidence based on the features present. By doing so, model 522 may be able to then learn with much larger learning rates, ultimately allowing for model 522 to converge much faster than the standard variant. Going further, it also allows model 522 to converge even lower when measuring the loss value, ultimately allowing the tempering neural network to perform competitively. In complex data scenarios, or if the nature of the data and problem is extremely non-linear, this variant can perform better than standard machine learning methods.

Consider an example of detecting credit card fraud. Transaction data may be received, and features may be identified Binary features:

Is transaction international (Yes/No)

Is merchant new to customer (Yes/No)

Is transaction amount higher than average (Yes/No)

Is time of day unusual for customer (Yes/No)

Categorical features:

Merchant category (Retail, Restaurant, Travel, etc.)

Payment method (Chip, Swipe, Manual entry, Online)

Device used (Mobile, Desktop, In-person)

Continuous features:

Transaction amount

Customer account age (in days)

Time since last transaction (in hours).

Number of transactions in last 24 hours

Traditional models might become overconfident in predicting fraud when certain features appear together (like international transactions at unusual times). The tempering approach would reduce this overconfidence, helping the model better recognize legitimate but unusual transactions, reducing false positives while maintaining high fraud detection rates.

Figure 8A:
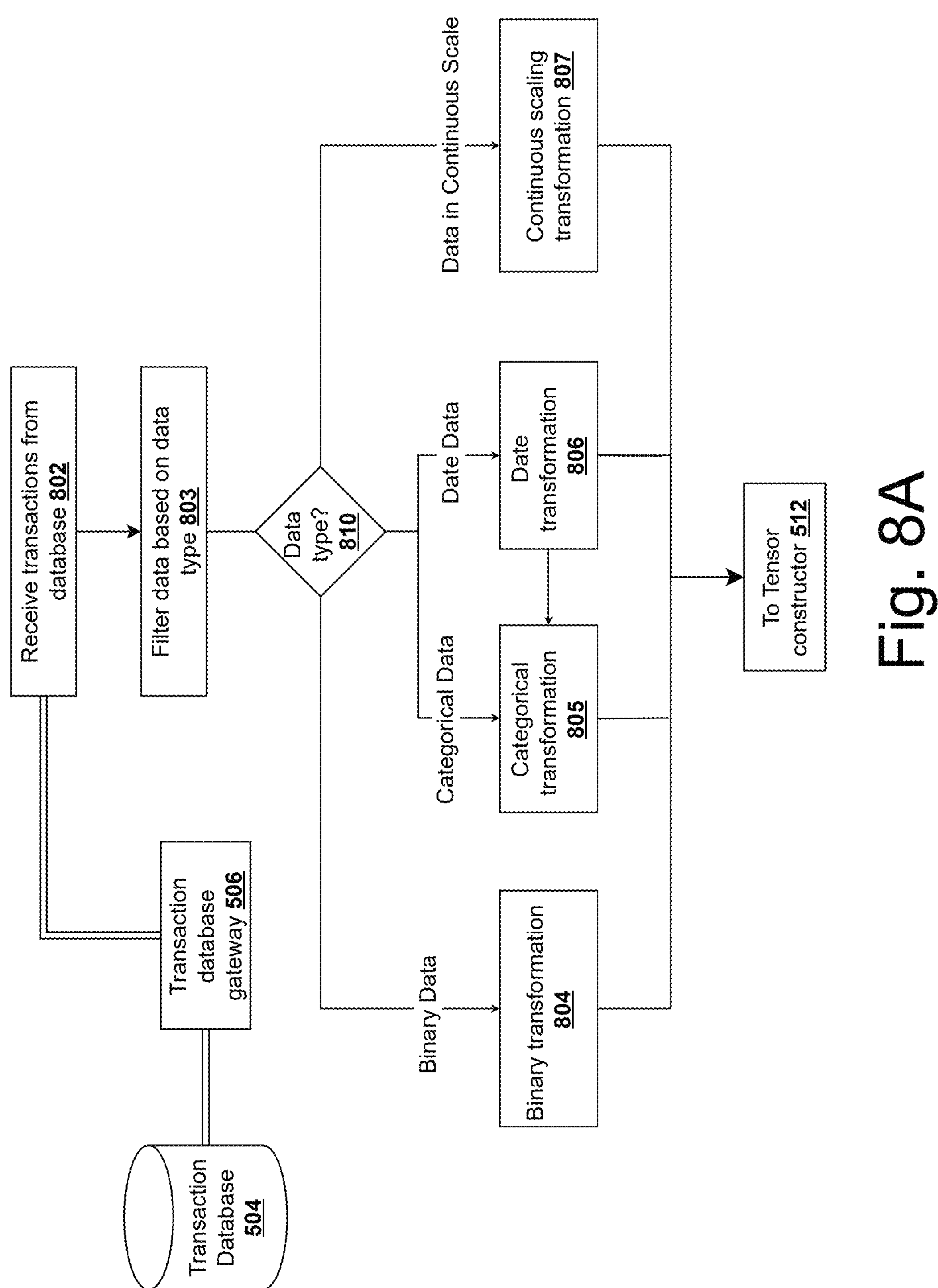
FIG. 8A is a flowchart illustrating the steps of data ingestion and type-specific transformations, according to an embodiment of the invention.

FIG. 8A is a flowchart illustrating the steps of data ingestion and type-specific transformations, according to an embodiment of the invention.

At step 802, computer 502 may receive transaction related data from transactional database 504, which interfaces with transaction database gateway 506 to pull data from transactional database 504. Upon receiving transactional data, this method 800 performs further parsing and analysis to retrieve data structure type and further clean based on data structure type.

At step 810, the received data is filtered based on data type using a data type detector 508 and the incoming data may be categorized into four distinct types: binary data, categorical data, date data, and data in continuous scale. Each data type follows its own transformation path.

At step 804, binary data undergoes binary transformation, converting various binary representations into standardized 0/1 values. For example, if the data is true it will transform into a 1 and if the data is false it will transform into a 0. This method may handle all forms of binary representations including strings that may represent binary categorization.

At step 805, categorical data passes through a categorical transformation, mapping categories to numerical indices. A categorical transformation method is responsible for transforming categorical data into numerical representations. If a given column of data contains five categories, it will transform the set of categories into a map between zero and four, where zero is the initial number. The purpose of this transformation is to be used as an index into further methods.

At step 806, date data is processed by date transformation, extracting temporal components like year, month, and day. These date transformations include turning the date into a date object, splitting the date into three categories per date. The three categories for each date are split into year, month, day of month. Therefore, each date is further configured into three categories which represent that single date. Once these dates are transformed into a categorical split, further categorical transformations are applied transforming them into numerical representations.

At step 807, continuous data may be normalized via continuous scaling transformation, typically scaling values to a 0-1 range. Upon receiving continuous scaled data (represented as either a floating-point numbers or even integers), transformation process scaling these values into an appropriate range for model 522. Typically, this scaling down takes large numbers of any scale and scales them down to a range between zero and one. The transformed data from steps 804-807 flows to the tensor constructor 512 for further processing in subsequent stages.

Figure 8B:
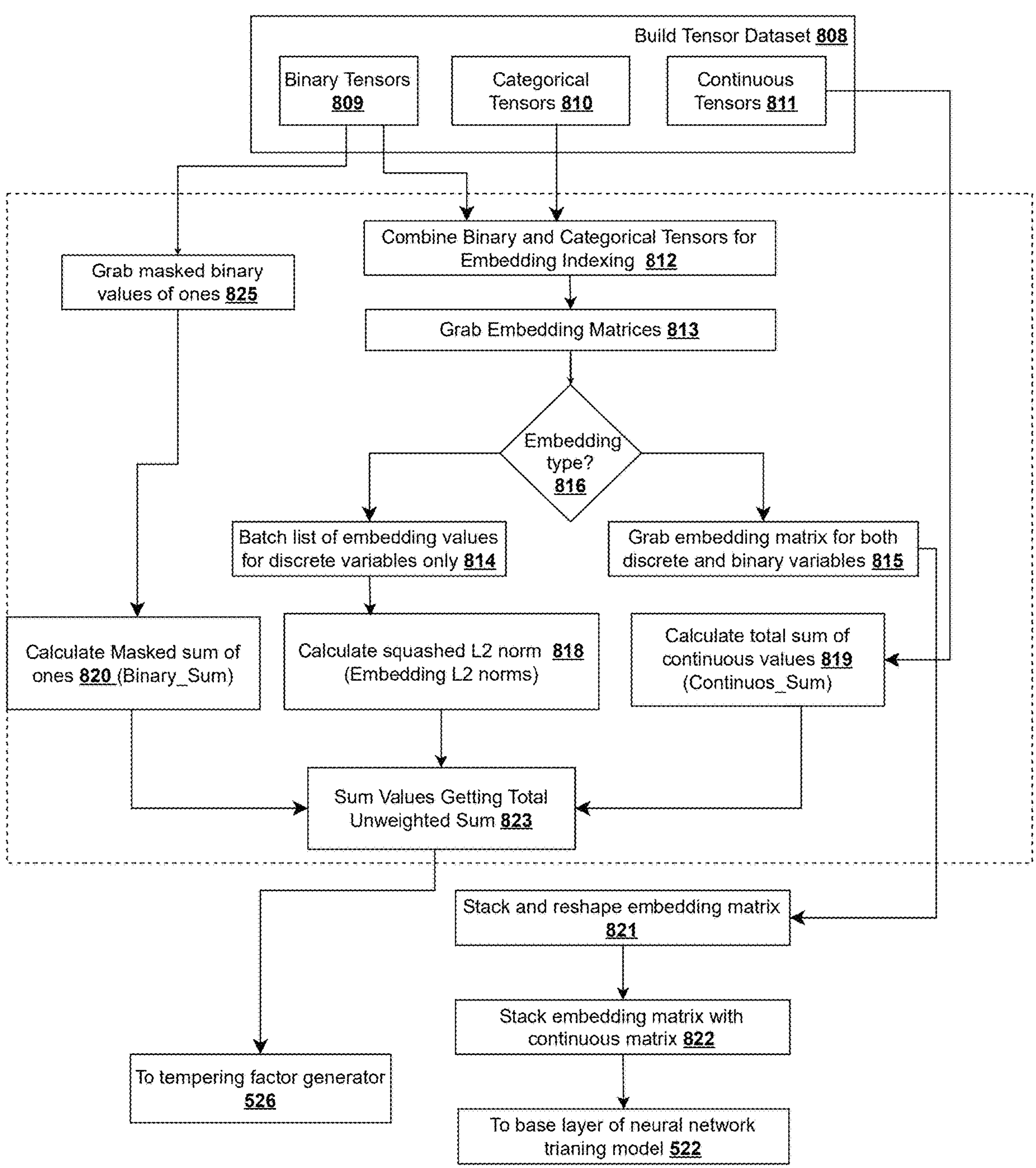
FIG. 8B is a flowchart illustrating the steps of tensor construction and embedding, according to an embodiment of the invention.

FIG. 8B is a flowchart illustrating the steps of tensor construction and embedding according to an embodiment of the invention. The tensor construction begins at step 808, with building of a tensor data. The transformed data from steps 804-807 flows to tensor constructor 512 and gets structured into different tensor formats. Once the data-transformations, are completed, a tensor-formatted dataset is constructed. This step converts individual values into vector-representations and further into batched matrices.

Binary tensors 809 serve as the foundational representation for presence/absence features in models 524 architecture. Binary tensors are binary values transformed into binary-vectors for each data instance, and a binary matrix representing the whole dataset of binary values. Binary Tensors are stored as a matrix of binary, integer values. This matrix is typically two-dimensional.

These tensors are structured as dense Boolean matrices of shape [batch_size, num_binary_features], where each element represents the presence (1) or absence (0) of a specific binary indicator. During processing, these binary tensors undergo specialized transformations that preserve their binary nature while enabling gradient-based optimization.

Categorical tensors 810 are categorical data transformed into categorical-vectors for each data instance, and categorical matrix representing the whole dataset of categorical values. Categorical Tensors are stored as a matrix of integer values where each integer value can be in the range of zero to infinity. This matrix is typically two-dimensional. Categorical tensors 810 may represent nominal variables with multiple possible values, structured as integer matrices of shape [batch_size, num_categorical_features].

Each element contains an integer index mapping to a specific category value in the corresponding feature's domain. The categorical tensors employ a sophisticated indexing scheme that handles hierarchical categorical relationships, allowing model 522 to leverage taxonomic structures when present in the data. For example, in geographical features, the system can represent city, state, and country as related categorical values rather than independent entities.

Continuous tensors 810 may capture numerical variables with ordered, continuous values, structured as floating-point matrices of shape [batch_size, num_continuous_features]. Continuous Tensors are stored as a matrix of floating values. Each floating-point value is typically a thirty-two-precision float, however, at times it can be represented as a sixteen-precision float. This matrix is typically two-dimensional.

At step 812, binary tensors 809 and categorical tensors 810 may be combined in to generate a unified indexing matrix stored in embedding registry 516. Unified indexing matrix may be generated using a sophisticated multi-domain indexing procedure. This process first allocates distinct embedding namespace ranges for each feature type, ensuring no index collisions across different categorical or binary domains. Binary features are treated as special two-class categorical variables but with optimized embedding retrieval paths. The resulting unified indexing matrix has shape [batch_size, total_feature_count]

Each value in the unified indexing matrix represents an index value into a weighted embedding matrix. Binary tensor matrix and categorical tensor matrix both serve as indexing matrices. Each individual value within the matrix represents an index into another matrix known as an embedding matrix which is a latent feature vector representing the object or category in reference. This method combines both indexing matrices into a single matrix. This is typically a two-dimensional matrix.

At step 813, on receiving a look-up request processor 530 interfaces with embedding registry 516 to retrieve embedding vectors associated with specific feature indices in the unified indexing matrix. Typically, this method returns a list representing a batch of data with each instance of the list representing the embedding vector of that categorical variable in reference.

At step 816, processor 530 may check the embedding type. The embedding retrieval process branches based on feature type requirements, enabling specialized handling that optimizes both computational efficiency and representational power for different feature domains.

Computer 504 may extract and aggregate several metrics from categorical embeddings, continuance feature values and binary values. Metrics computed at steps 820, 818, 819 are combined.

In the case of categorical variables, processor 530, at step 814, may retrieve a batched list of embedding values for discrete variable corresponding to categorical features. Embeddings may be retrieved using a sliced tensor gather operation that extracts only the embeddings corresponding to categorical features.

At step 815, processor 530 may retrieve embedding for both discrete and binary variables. A unified embedding retrieval process may support both categorical and binary features simultaneously. This unification delivers computational efficiency through vectorized operations while maintaining semantically appropriate representations.

At step 825, processor 530 may implement implements a selective filtering operation that isolates (grabs) active binary signals (those with value 1) from the original binary tensor and grab masked binary values of ones.

At step 820, processor 530 may compute a row-wise sum of the masked binary tensor, producing a vector of shape [batch_size] where each element represents the total count of active binary features for the corresponding example. The masked sum of ones represents the total number of binary indicators.

At step 818, processor 530 may calculate the L2 norm of each categorical embedding vector and apply sigmoid squashing before summation. Specifically, for each embedding vector v in the categorical embeddings, the system computes: 1. L2 norm calculation: $\|v\|_2=\sqrt{(v_1^2+v_2^2+\ldots+v_n^2)}$ 2. Sigmoid activation: $(\|v\|_2)=1/(1+e\hat{}(-\|v\|_2)$ 3. Summation: Total_Embedding_Magnitude=$\Sigma\sigma(\|v_i\|_2)$ for all categorical embeddings This squashing mechanism ensures that no single large embedding vector can disproportionately influence the unweighted sum, maintaining balanced contributions across all categorical features regardless of their learned embedding magnitudes.

This method processes a list of embedding vectors representing categorical variables and calculates the L2 norm (magnitude) of each individual vector. For each embedding vector, the system For each_embedding_vector in categorical_embeddings:
12_norm=sqrt (sum (embedding_vector ** 2))
squashed_norm=sigmoid (12_norm)
total_embedding_signal+=squashed_norm This measures the cumulative strength or "magnitude" of embeddings signals, not relationships/distance between different embeddings. Each embedding contributes based on its own magnitude, not relative position At step 819, processor 530 may calculate a total sum of continuous values by aggregating continuous feature values.

At step 823, metrics computed at steps 820, 818, 819 may be combined to generate a total unweighted sum that is provided as an input for the tempering factor generator 526.

Unweighted sum is the total quantity of active features present in an input instance, calculated as the sum of binary feature counts, categorical embedding magnitudes, and normalized continuous feature values, without applying learned weights. Binary feature count is count of binary features with value 1 (true/present). Categorical embedding magnitudes refers to the sum of L2 norms of categorical embedding vectors, each passed through a sigmoid activation function to prevent dominance by large embeddings. Normalized continuous feature values are the sum of all continuous features scaled to the range [0,1]. Few active features may result in minimal tempering and preservation of base model output. Many active features may result in a high unweighted sum requiring strong tempering and reduction in overconfident predictions. Balanced/normal number of active features may result in moderate unweighted sum requiring proportional tempering based on evidence quantity. The term "unweighted" indicates this sum reflects the raw quantity of input evidence present in the data, independent of any learned neural network parameters or feature importance weights.

At step 821, embedding in continuous features may be transformed into a unified representation matrix. This process employs dimension-preserving reshaping operations that maintain the semantic structure of the embeddings while preparing them for neural network processing At step 822, embedded categorical representations are combined with the processed continuous features to create a unified feature tensor that serves as input to the neural network layers. This unified feature tensor is then processed by neural network training model 522.

Figure 8C:
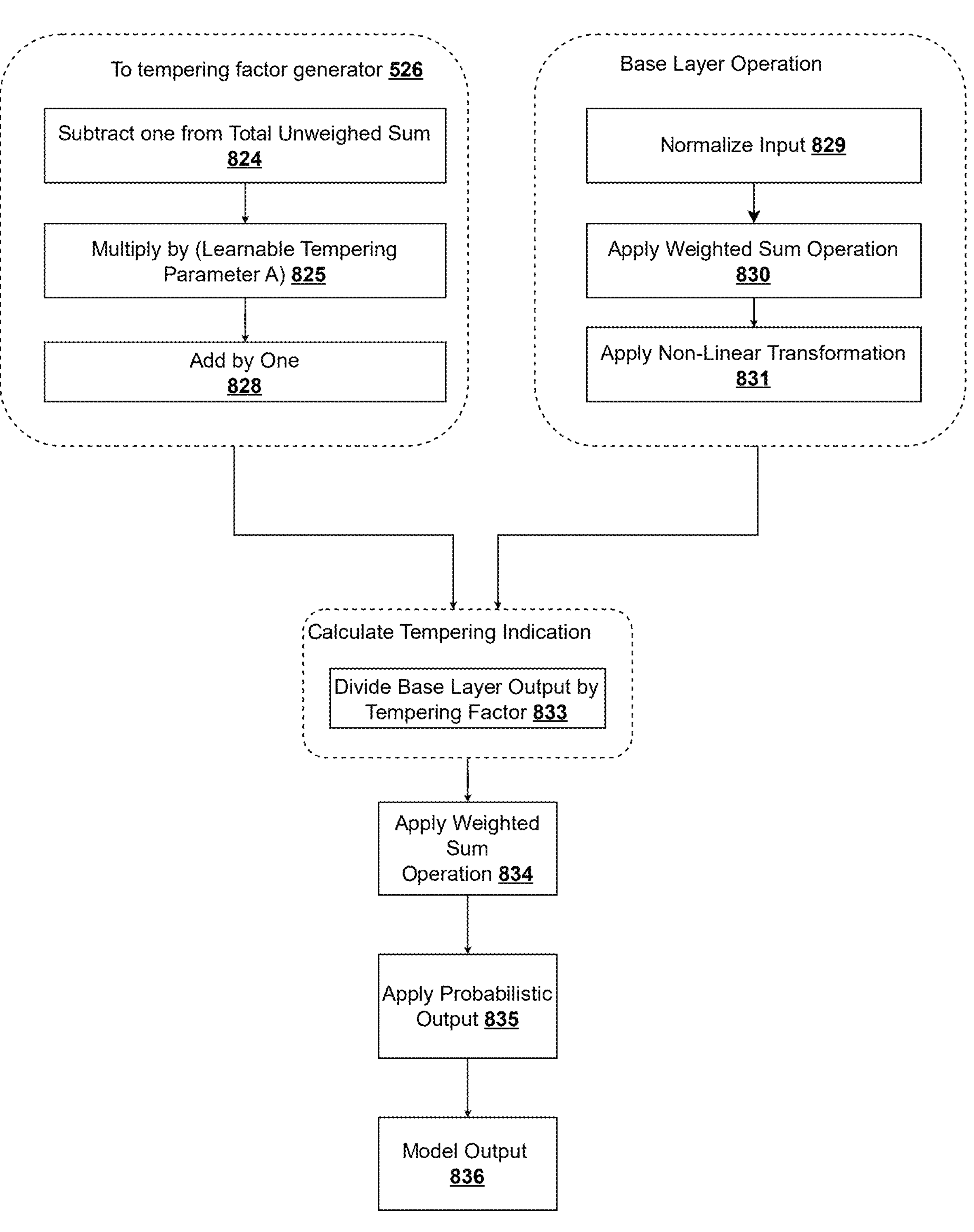
FIG. 8C illustrates the tempering mechanism and final output phase of the neural network system, according to an embodiment of the invention.

FIG. 8C illustrates the tempering mechanism and final output phase of the neural network system, according to an embodiment of the invention.

The left side indicates the steps in the tempering factor calculation. At step 824, one is subtracted from a total unweighted sum. This may serve as an offset/adjustment to the unweighted sum calculation.

adjusted_sum=unweighted_sum−1

At step 825, adjusted_sum calculated in step 824 is multiplied by a tempering parameter. This parameter can be learned through gradient descent or can remain fixed if non-learnable.

scaled_adjusted_sum=tempering parameter (A)*adjusted_sum

Tempering parameter scales the tempering intensity across the entire model and is a critical parameter in the tempering mechanism. Smaller values of the tempering parameter indicate an application of minimal tempering, and the neural network training model 522 may maintain higher confidence levels. Larger values of the tempering parameter indicate application of aggressive tempering, substantially reducing confidence when many signals are present.

In an embodiment, tempering parameter (A) is not a single value and multiple tempering value may exist for a single application area. Further, the values of the tempering parameter may be static and based on the domain type.

In an embodiment, in case of high-stake decision-making higher values of tempering parameter may be used. A higher tempering parameter will ensure that false positives are reduced. Examples of high-stake decision making include, but are not limited to, insurance fraud detection, financial risk assessment, legal decision support. The value of A may range between (0.15-0.25).

In an embodiment, in case of life critical applications, lower values of tempering parameter may be used as false negatives can be catastrophic. Examples of life critical applications may include, but are not limited to, industrial hazard detection and nuclear plant monitoring, the value of A may range between (0.05-0.10). In some cases, the values of the tempering parameter may be adjustable and set based on the quality of data, other data characteristics.

The selection of tempering parameter values follows a systematic methodology based on application requirements and data characteristics. For applications where false positives carry higher cost than false negatives (such as insurance fraud detection), tempering parameter values in the range of 0.15-0.25 provide appropriate confidence reduction. For life-critical applications where false negatives are catastrophic (such as medical diagnosis or safety monitoring), lower tempering parameter values of 0.05-0.10 maintain higher sensitivity while still providing confidence regulation. The initial tempering parameter selection begins with the midpoint of the appropriate range, followed by validation testing on representative datasets. Parameter adjustment proceeds in increments of 0.02-0.05 based on observed convergence behavior and classification performance metrics. Data characteristics that indicate higher tempering parameter needs include high feature density, significant feature correlation, and datasets with many weakly predictive signals.

At step 828, one is added to the scaled_adjusted_sum computer at step 825. The addition of 1 ensures that the tempering factor is always >1, guaranteeing that tempering always reduces confidence (dividing by values ≥1) rather than potentially inflating it.

This parameter is learned during model training through backpropagation and can be regularized with specific constraints to prevent pathological solutions. Some implementations replace scalar A with a vector of parameters that provides feature-type-specific tempering rates.

The tempering factor calculation leverages vectorized operations that execute mathematical computations on multiple data elements simultaneously using parallel processing hardware. The sequence of operations for tempering factor calculation—subtraction of one from the unweighted sum, multiplication by the tempering parameter, and addition of one—are implemented as Single Instruction, Multiple Data (SIMD) operations that process entire batches of training examples in parallel rather than sequentially. Vector processing units execute these operations across multiple data instances within a training batch simultaneously, where each vector lane processes the tempering factor calculation for a different training example. This vectorized implementation reduces computational latency by exploiting the inherent parallelism in batch processing, as the tempering factor calculation for each data instance is independent and can be computed concurrently. The parallel processing hardware optimizations include memory access patterns that minimize cache misses during batch processing and instruction scheduling that maximizes utilization of available vector processing units.

At step 829, normalization (typically batch normalization or layer normalization) may be applied to the combined feature representation from step 822. Normalization may make model 522 less sensitive to input scale variations. The specific normalization technique selected depends on the expected batch size and feature distributions, with layer normalization often preferred for smaller batch sizes.

At step 830, a linear transformation to the normalized data. This is a simple linear operation of our input and some weighted parameters that change throughout gradient descent training.

At step 831, a non-linear or otherwise known as a non-affine transformation is applied. The system typically employs SoftMax or sigmoid activation depending on whether the task is multi-class or binary classification. This non-linearity enables model 522 to capture complex, non-linear relationships between inputs and outputs.

Once the base layer operation is completed, and a tempering factor has been generated, then at step 833, base layer output (right path) is combined with the tempering factor calculation A tempering indication is calculated by dividing the base layer output by the tempering factor. This is where the actual tempering occurs: tempered output=base_layer_output/tempering factor This division scales down the base layer operation output matrix using the tempering factor.

At step 834, a second linear transformation is applied without tempering indication and a weighed sum operation is performed. At step 835, a second non-linear transformation is applied. This is typically a non-linear transform that maps output probabilities for the classes we are trying to predict. The output from the non-linear transformation may be referred to as raw model output. The tempered and transformed outputs are converted into proper probabilities. The tempering mechanism ensures these probabilities are well-regulated, avoiding overconfidence even when many weak signals are present. The final output represents the tempered probability estimates for each class. These probabilities have better predicted probabilities and have reduced false positive rates.

The disclose method 800 provides significant advantages over existing neural network architectures for tabular data classification. By implementing a dynamic tempering mechanism, the system enables neural networks to achieve better calibration of prediction confidence, faster convergence during training, improved generalization to unseen data, and ultimately higher classification accuracy without requiring complex ensemble architectures or computationally expensive Bayesian approaches.

Exemplary Embodiments

The tempering mechanism has been successfully applied to several real-world tabular data problems where standard neural networks and other machine learning approaches failed to achieve satisfactory results.

Example: Healthcare Readmission Prediction

Example Patient Data Point-Let's consider a 67-year-old patient discharged after treatment for congestive heart failure:

Binary Features:
- Previous readmission (Yes=1)
- Multiple diagnoses (Yes=1)
- Surgical procedure performed (No=0)
- Taking multiple medications (Yes=1)
- Lives alone (Yes=1)

Categorical Features:
- Primary diagnosis (Category 3="Congestive Heart Failure")
- Insurance type (Category 2="Medicare")
- Discharge location (Category 1="Home")
- Hospital department (Category 5="Cardiology")
- Admission type (Category 0="Emergency")

Continuous Features:
- Length of stay (8 days →scaled to 0.32)
- Patient age (67 years →scaled to 0.74)
- Number of previous admissions (3→scaled to 0.15)
- Systolic blood pressure at discharge (145 mmHg →scaled to 0.62)
- Oxygen saturation at discharge (94% →scaled to 0.42)
- Hemoglobin A1C test result (7.2% →scaled to 0.65)
- Date features:
- Admission date (03/15/2025→year=2025, month=3, day=15)
- Discharge date (03/23/2025→year=2025, month=3, day=23)

Tempering operation: Data transformation.
- Binary data is transformed into 1s and 0s: [1, 1, 0, 1, 1]
- Categorical data is transformed into indices: [3, 2, 1, 5, 0]
- Continuous data is scaled to [0.32, 0.74, 0.15, 0.62, 0.42, 0.65]

Embedding Creation:
- Binary values like "previous readmission=yes" are mapped to embedding vectors
- Categorical values like "Congestive Heart Failure" (Category 3) are mapped to embeddings.
- For instance, "Congestive Heart Failure" might map to a vector like [0.42, 0.65, −0.28, 0.91, −0.33]

Unweighted Sum Calculation:
- Binary sum: Count of 1s=4 (previous readmission+multiple diagnoses+multiple medications+lives alone)
- Embedding magnitude sum: Let's say this equals 4.37 (the total vector magnitudes of all categorical embeddings)
- Continuous sum: 0.32+0.74+0.15+0.62+0.42+0.65=2.90
- Total unweighted sum=4+4.37+2.90=11.27

Tempering Factor Calculation:
- Subtract 1:11.27−1=10.27
- Multiply by parameter A (let's say A=0.18): 10.27×0.18=1.85
- Add 1:1.85+1=2.85
- Tempering factor=2.85
- Neural Network Processing: The neural network processes the combined features. Let's say the base layer operation outputs a vector [0.92, 0.08] for our two classes (will be readmitted within 30 days vs. will not be readmitted). This would indicate extremely high confidence (92%) that this patient will be readmitted Applying Tempering:

Divide the output by the tempering factor: [0.92, 0.08] =2.85=[0.32, 0.03]

After normalization in the final layer, the final output might be [0.78, 0.22]

The model is now less confident (78% instead of 92%) about this patient being readmitted Without tempering, the hospital's resource allocation system might flag this patient with 92% confidence for intensive post-discharge care, and potentially allocate resources based on an exaggerated risk score and miss other at-risk patients due to resource constraints With tempering, the confidence is reduced to a more reasonable 78%. Resource allocation becomes more balanced and appropriate. Model 522 avoids becoming fixated on certain feature combinations (like previous readmission+heart failure+Medicare)

This more nuanced prediction by classification system allows the hospital to implement a proportional follow-up plan (perhaps weekly phone check-ins rather than daily nurse visits), better distribute limited follow-up resources across all discharge patients, reduce unnecessary readmissions while avoiding excessive interventions, and improve overall patient outcomes by addressing true risk factors rather than statistical artifacts. For healthcare systems where resources are limited and must be allocated efficiently, this more tempered confidence level leads to better decision-making and ultimately better patient care.

In some embodiments, the technological benefits of the tempering mechanism extend beyond improved accuracy to provide significant computational efficiency gains that justify the hardware complexity of the specialized processing units. For healthcare readmission prediction systems, the ability to train at substantially higher learning rates while maintaining superior calibration reduces computational costs for hospitals that must process large patient datasets daily. The significant reduction in training time translates directly to reduced cloud computing costs and faster model deployment cycles, enabling healthcare systems to update their models more frequently with fresh data while consuming fewer computational resources.

In fraud detection applications, the improved calibration achieved through tempering substantially reduces false positive rates compared to untempered networks, which decreases the computational load on downstream investigation systems that must process flagged transactions. The hardware-optimized implementation ensures that these accuracy improvements are achieved without proportional increases in computational cost, as the parallel tempering calculations add minimal overhead while providing substantial improvements in both prediction quality and training efficiency.

Figure 9:
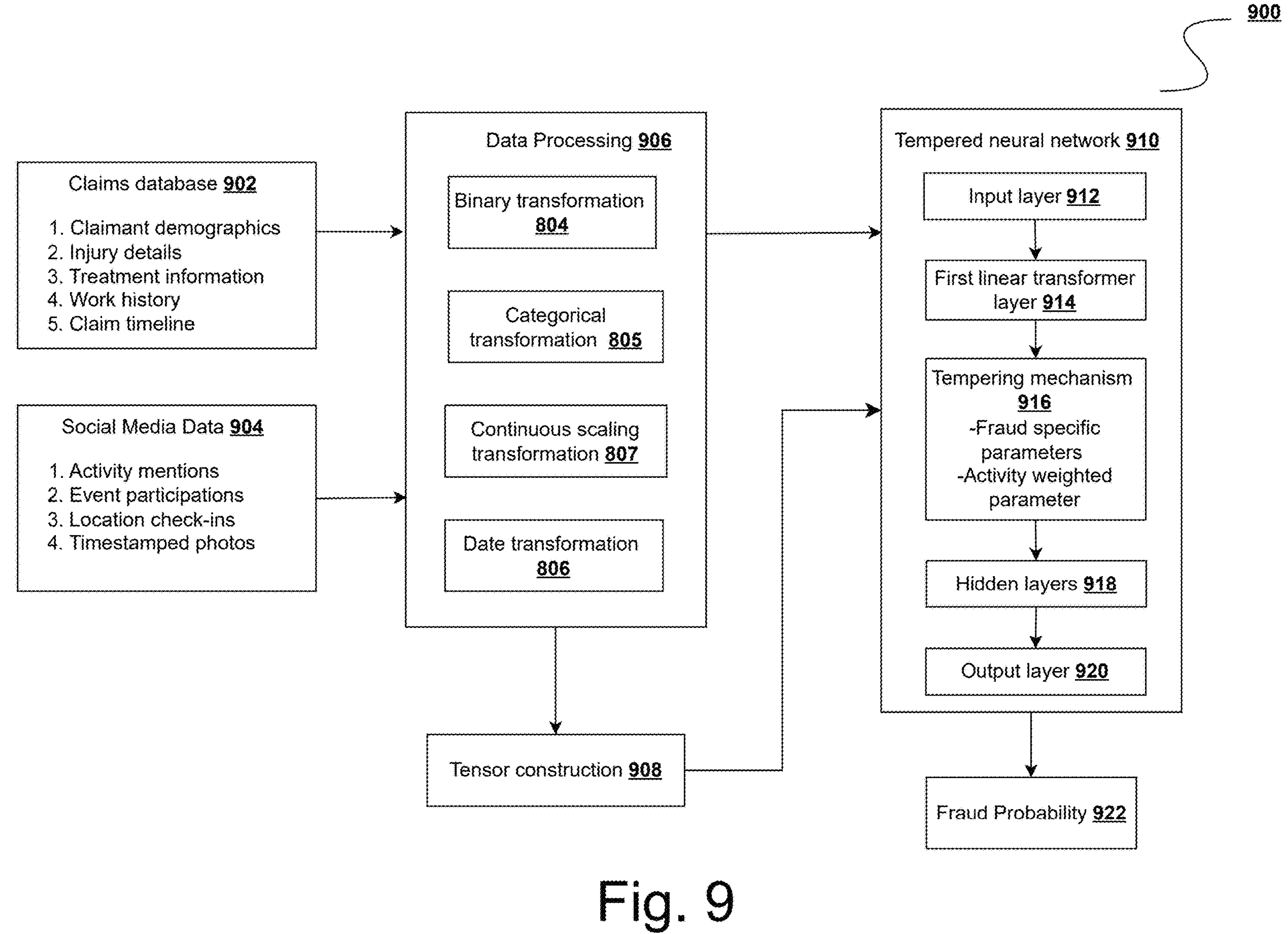
FIG. 9 is a block diagram illustrating a comprehensive fraud detection system implementing tempering neural network methodology for insurance claims fraud detection, according to an embodiment of the invention.

FIG. 9 is a block diagram illustrating a comprehensive fraud detection system 900 implementing tempering neural network methodology for insurance claims fraud detection. FIG. 9 demonstrates the end-to-end application of the tempering mechanism in a real-world insurance fraud detection scenario.

The system begins with two primary data sources. Claims database 902 serves as the primary structured data repository containing traditional insurance claim information including claimant demographics, injury details, treatment information, work history, and claim timeline data. This database stores tabular data in structured format with mixed data types including binary indicators (e.g., prior claims history), categorical variables (e.g., injury type, treatment facility), continuous variables (e.g., claim amount, treatment duration), and temporal data (e.g., injury date, claim filing date).

Social media data 904 represents the secondary data source containing unstructured and semi-structured information extracted from claimant social media profiles and activities. This data includes activity mentions, event participations, location check-ins, and timestamped photos that may contradict claimed injury limitations or treatment requirements.

Data processing 906 serves as the unified preprocessing pipeline that transforms both structured claims data and unstructured social media data into standardized formats suitable for neural network processing. Data transformation methodology is implemented in the tempering system, including binary transformation 804, categorical transformation 805, date transformation 806, and continuous scaling transformation 807.

The transformed data flows into tensor construction 908, which converts the preprocessed data into multi-dimensional tensor representations organized by data type. This component creates binary tensors for presence/absence indicators, categorical tensors for nominal variables, and continuous tensors for numerical measurements, following the tensor construction methodology outlined in the tempering framework.

Tempered neural network 910 represents the core machine learning component that implements the tempering mechanism. The network consists of an input layer 912 that receives the constructed tensors, multiple hidden layers 916 that learn complex feature representations, and an output layer 918 that produces fraud probability 922 scores. A tempering mechanism 916, which calculates a tempering factor based on the unweighted sum of input features and applies this factor to regulate the network's confidence levels.

Fraud-specific parameters enhance the tempering mechanism with domain-specific calibration. The activity weighted parameter specifically adjusts the tempering strength based on the quantity and nature of social media indicators that contradict claimed injury limitations. This parameter recognition that social media indicators may be particularly prone to generating false confidence in fraud detection scenarios.

The system outputs fraud probability 922, which represents a well-calibrated probability score indicating the likelihood that a given insurance claim is fraudulent. Unlike traditional neural networks that might produce overconfident predictions when numerous weak social media signals are present, the tempering mechanism ensures that these probabilities accurately reflect the true uncertainty in the prediction.

The architecture demonstrates several key advantages of the tempering approach in fraud detection: First, it prevents overconfidence when multiple weak social media indicators are present (e.g., numerous photos of physical activities that might not actually contradict the claimed injury). Second, it enables the integration of diverse data sources while maintaining proper confidence calibration. Third, it provides interpretable probability outputs that can guide investigative resource allocation.

Figure 10:
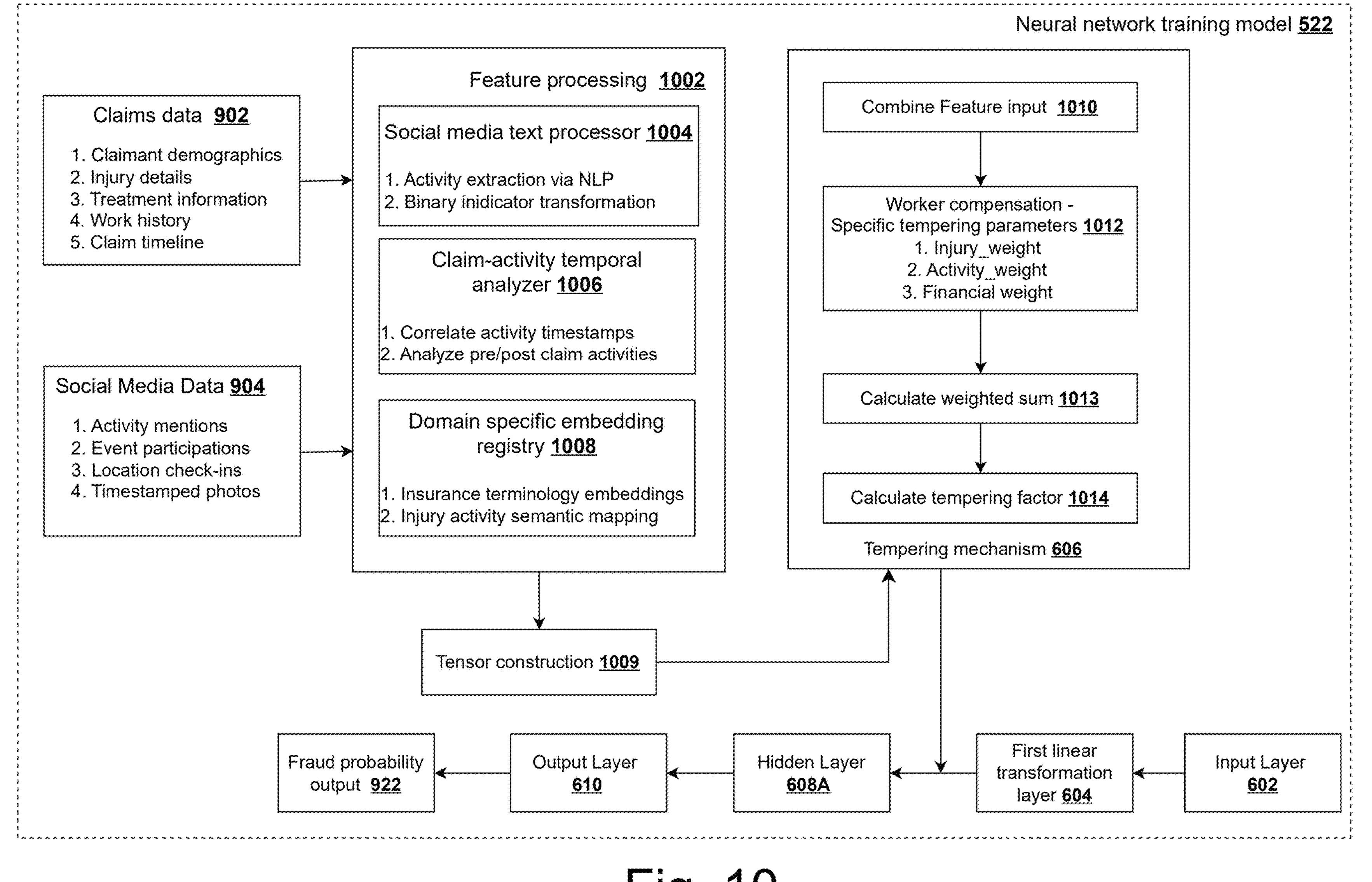
FIG. 10 is a detailed block diagram illustrating the specific implementation of tempering mechanism used by a model for detecting fraud in workers' compensation data, according to an embodiment of the invention.

FIG. 10 is a detailed block diagram illustrating the specific implementation of tempering mechanism used by a model for detecting fraud in workers' compensation data. FIG. 10 provides details of the components and processes shown conceptually in FIG. 9. This figure demonstrates the technical implementation of domain-specific tempering mechanisms tailored for workers' compensation insurance fraud detection.

The system processes two specialized data streams with enhanced domain-specific processing capabilities, claims database 902 and social media data 904 is processed through specialized extraction mechanisms.

Feature processing 1002 represents the comprehensive data preparation pipeline that implements domain-specific transformations. This feature processing step builds upon the general data processing 906 framework described in FIG. 9, Social media text processor 1004 employs advanced natural language processing techniques for activity extraction via NLP, using named entity recognition, sentiment analysis, and activity classification algorithms to identify and categorize physical activities mentioned in social media posts. Binary indicator transformation converts these extracted activities into binary presence/absence indicators suitable for neural network processing.

Claim-activity temporal analyzer 1006 performs sophisticated temporal correlation analysis by correlating activity timestamps with injury dates, treatment periods, and claimed disability durations. This component analyzes pre/post claim activities to identify patterns that may indicate fraudulent behavior, such as high-intensity physical activities occurring shortly before or after claimed dates, or social media activities that contradict stated physical limitations during treatment periods.

Domain-specific embedding registry 1008 maintains specialized vector representations tailored for workers' compensation fraud detection. Insurance terminology embeddings provide semantic representations for insurance-specific terms, injury classifications, treatment codes, and legal terminology. Injury-activity semantic mapping creates learned associations between specific injury types and contraindicated activities, enabling the system to recognize when social media activities are particularly relevant to specific claimed injuries.

After feature processing 1002, tensor constructor 512 may build multi-dimensional tensor representations of the transformed claims and social media data, organizing binary indicators, categorical mappings, temporal features, and continuous values into appropriate tensor structures suitable for neural network processing.

The combine feature input 1010 process integrates the processed claims data with the analyzed social media indicators, creating a unified feature representation that maintains the semantic relationships between traditional insurance data and social media-derived indicators.

The system implements worker compensation-specific tempering parameters 1012 that provide domain-calibrated confidence regulation: (1) Injury weight adjusts tempering strength based on injury severity and type, recognizing that more severe injuries should generate stronger tempering when contradictory activities are present; (2) Activity weight modulates tempering based on the relevance and intensity of detected social media activities relative to claimed limitations; and (3) Financial weight incorporates claim amount and financial incentives into the tempering calculation, acknowledging that higher-value claims may warrant more conservative confidence levels. The weighted sum approach allows the system to apply domain knowledge (activity indicators being more relevant than financial anomalies in fraud detection) directly into the confidence calculation.

The calculation of weighted sum 1013 and tempering factor calculation 1014 are based on domain-specific parameters. The tempering factor is calculated as: $T=1+(\text{injury\_weight}\times\text{activity\_weight}\times\text{financial\_weight})\times(\text{unweighted\_sum}-1)$, where the three domain-specific weights modulate the tempering strength based on case characteristics. The tempering factor automatically adjusts based on evidence quantity-minimal tempering when evidence is sparse, stronger tempering when multiple weak signals accumulate.

Neural network training model 522 may implement a sophisticated multi-stage processing architecture that addresses the overconfidence problem inherent in traditional neural networks when processing tabular data with multiple weak signals. The system receives structured data from claims database 902 and social media data 904. Feature processing 1002 applies specialized transformations including binary transformation for activity indicators, categorical transformation for injury classifications, continuous scaling for financial features, and date transformation for temporal patterns. The system implements a domain specific embedding registry utilizing L2 norm calculations with sigmoid squashing rather than pairwise Euclidean distances, as this approach measures individual embedding vector magnitudes while preventing large embeddings from dominating the feature space through the sigmoid mapping to [0,1] range. Neural network architecture may process these features through input layer 610, followed by hidden layers 604A where the critical tempering intervention occurs. Unlike traditional approaches that apply regularization throughout the network, tempering mechanism 606 is applied exactly once immediately after the first linear transformation layer 604, dividing the intermediate output by the calculated tempering factor before proceeding to subsequent hidden layers 604A and output layer 610. This single-point tempering application prevents the accumulation of overconfidence while preserving the network's learning capacity. By applying tempering only once after the first linear layer, the network retains its ability to learn complex patterns while preventing overconfidence accumulation.

Tempering mechanism 606 utilizes Workers' compensation specific tempering parameters including activity weight (0.7), injury weight (0.5), and financial weight (0.3), combined with a fraud-optimized tempering parameter A of 0.15. Tempering factor generator 526 implements the formula: $\text{tempering\_factor}=1+A\times(\text{weighted\_sum}-1)$, where the weighted sum reflects domain-specific feature importance rather than treating all evidence equally.

Unlike complex ensemble methods, tempering requires only one mathematical operation at a specific point in the network, making it computationally efficient and easy to implement.

Figure 11:
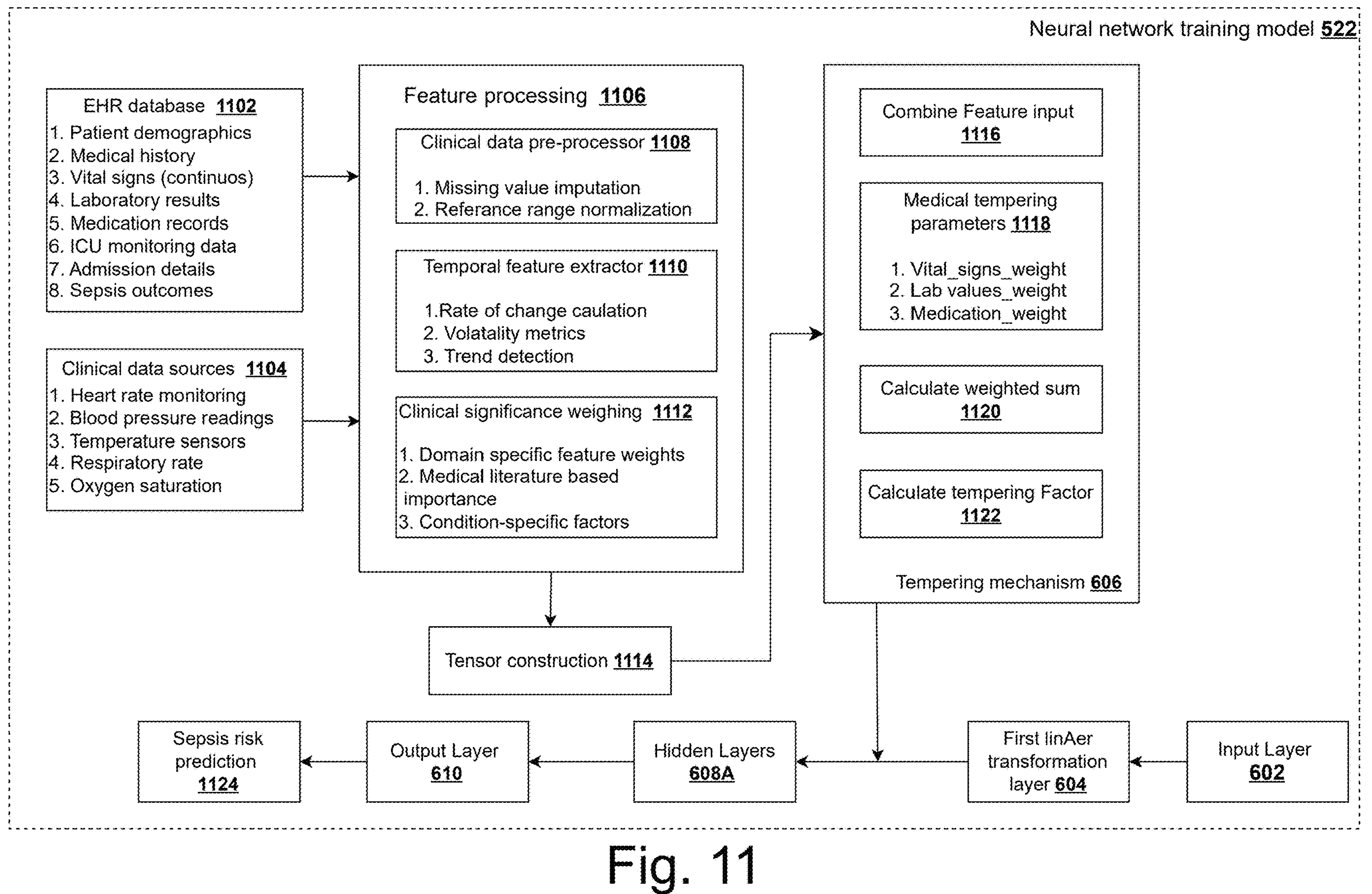
FIG. 11 is a detailed block diagram illustrating the specific implementation of tempering mechanism used by a model for sepsis risk prediction in healthcare settings, integrating multiple clinical data streams, according to an embodiment of the invention.

FIG. 11 is a detailed block diagram illustrating the specific implementation of tempering mechanism used by a model for sepsis risk prediction in healthcare settings, integrating multiple clinical data streams. The application of neural network confidence regulation in healthcare environments where accurate risk assessment is critical for patient outcomes is described.

The system processes two primary clinical data sources with specialized medical domain processing capabilities. Electronic Health Records (EHR) database 1102 may serve as the comprehensive electronic health record repository containing patient demographics, medical history, vital signs (continuous), laboratory results, medication records, ICU monitoring data, admission details, and sepsis outcomes. This database represents the structured clinical data foundation with mixed data types including binary indicators (e.g., presence of comorbidities, medication allergies), categorical variables (e.g., admission type, primary diagnosis codes), continuous variables (e.g., laboratory values, vital sign measurements), and temporal data (e.g., admission timestamps, medication administration times).

Clinical data sources 1104 represents the real-time physiological monitoring systems that may provide continuous streams of patient data including heart rate monitoring, blood pressure readings, temperature sensors, respiratory rate measurements, and oxygen saturation levels. This data stream captures the dynamic nature of patient conditions and provides high-frequency temporal patterns essential for sepsis detection.

Feature processing 1106 serves as the comprehensive medical data preparation pipeline that implements healthcare-specific transformations, building upon the general data processing framework established in the tempering system architecture.

Clinical data pre-processor 1108 employs sophisticated medical data handling techniques including missing value imputation using clinically appropriate methods (such as forward-fill for vital signs or median imputation for laboratory values), and reference range normalization that scales clinical measurements according to established medical reference ranges rather than simple min-max scaling, ensuring that the normalization preserves clinical significance.

Temporal feature extractor 1110 performs advanced time-series analysis specifically designed for clinical data patterns. This component implements rate of change calculations that track how quickly vital signs are deteriorating or improving, volatility metrics that measure the stability of physiological parameters over time, and trend detection algorithms that identify gradual changes in patient condition that may precede sepsis onset. These temporal features are particularly crucial in sepsis prediction as the condition often manifests through subtle changes in vital sign patterns before becoming clinically apparent.

Clinical significance weighting 1112 represents a domain-specific enhancement that applies medical knowledge to feature importance. This component implements domain-specific feature weights based on established clinical literature regarding sepsis risk factors, medical literature-based importance scoring that reflects peer-reviewed research on sepsis predictors, and condition-specific factors that adjust feature weights based on patient-specific conditions such as age, comorbidities, and current treatments.

Following feature processing, tensor construction 1114 builds multi-dimensional tensor representations of the transformed clinical data, organizing binary indicators, categorical mappings, temporal features, and continuous values into appropriate tensor structures suitable for neural network processing.

Combine feature input 1116 integrates the processed EHR data with the analyzed real-time monitoring data, creating a unified feature representation that maintains the clinical relationships between historical patient data and current physiological status. This integration preserves the temporal context essential for understanding disease progression.

The system implements medical tempering parameters 1118 that provide healthcare-calibrated confidence regulation specifically designed for sepsis prediction: vital_signs_weight adjusts tempering strength based on the number and severity of abnormal vital sign readings; lab_values_weight modulates tempering based on the quantity and deviation of laboratory results from normal ranges; and medication_weight incorporates the patient's current medication regimen into the tempering calculation. For life-critical applications like sepsis prediction, the tempering parameter A typically ranges between 0.05-0.10 to minimize false negatives, as missed sepsis cases can be catastrophic.

Calculate weighted sum 1120 and calculate tempering factor 1122 implement the domain-specific tempering calculation:

$$T = 1 + A \times (\text{vital\_signs\_weight} \times \text{lab\_values\_weight} \times \text{medication\_weight}) \times (\text{unweighted\_sum} - 1)$$

Neural network training model 522 implements the clinical prediction architecture with tempering mechanism 606 applied exactly once after first linear transformation layer 604, dividing the intermediate output by the calculated tempering factor before proceeding through hidden layers 608A and output layer 610. This single-point tempering application prevents overconfidence accumulation while preserving the network's ability to detect subtle sepsis patterns.

The system outputs sepsis risk prediction 1124, providing well-calibrated probability scores that accurately reflect clinical uncertainty, enabling healthcare providers to make informed decisions about patient monitoring intensity and intervention timing.

The skilled person will be aware of a range of possible modifications of the various embodiments described above. Accordingly, the present invention is defined by the claims and their equivalents.

What is claimed is:

1. A system for training a neural network, the system comprising:

a computer system comprising one or more processors configured with vector processing units optimized for tensor operations and Single Instruction Multiple Data (SIMD) instruction execution, memory comprising high-speed Random Access Memory (RAM) allocated for tensor storage and a dedicated cache for embedding vector lookups, and a plurality of programming instructions stored in the memory that, when executed by the vector processing units:

receive, from a database, transactional data, wherein the transactional data comprises structured data records in tabular format having mixed data types including binary, categorical, and continuous features;

perform data transformation of the transactional data based on data type, wherein binary data transforms to zeros and ones, categorical data transforms to numerical indices, and continuous data is transformed by scaling to values between zero and one;

construct tensor representations for each transformed data type;

combine the binary tensor representation and the categorical tensor representations to generate a unified indexing matrix for embedding vector lookup, wherein the unified indexing matrix concatenates indices from both tensor types for embedding vector lookup;

upon a look-up request, retrieve embedding vectors from the unified indexing matrix;

calculate a masked sum of binary features ones;

calculate a total sum of L2 norms of categorical embedding vectors, wherein each L2 norm is computed as the square root of the sum of squared vector components and passed through a sigmoid activation function;

calculate a total sum of continuous feature values;

combine the masked sum of binary feature ones, the total sum of L2 norms, and the total sum of continuous feature values to generate a total unweighted sum of features;

calculate a tempering factor by applying a sequence of operations to the total unweighted sum, wherein the sequence of operation comprises: a subtraction of one, multiplication by a tempering parameter, and addition of one, wherein value of the tempering parameter is indicative of strength of a tempering mechanism; and modify the neural network to a tempered neural network by applying and positioning the tempering mechanism as a single confidence gate, which calculates the tempering factor, at some point between the neural network input and output layer; and provide the tempering factor to a neural network training model processing the transformed data, wherein an intermediate output of the neural network is divided by the tempering factor to generate predictions with reduced confidence scaling proportional to feature quantity;

wherein the tempering mechanism enables neural network training convergence at learning rates 2-5 times higher than untempered neural networks while maintaining classification accuracy within 2% of optimal performance, and wherein a regulated confidence of predictions achieve calibration error below 0.05 compared to 0.15 or higher for untempered networks.

2. The system of claim 1, wherein to perform data transformation of the transactional data based on data type, the programming instructions when further executed by the processor cause the processor to:

transform date data in the transactional data into separate numerical values for year, month, and day.

3. The system of claim 1, wherein when the unweighted sum of features equals one, the tempering factor equals one.

4. The system of claim 1, wherein the instructions further cause the processor to normalize the transformed data using batch normalization prior to processing by the neural network.

5. The system of claim 1, wherein the tempering factor increases linearly with increases in the unweighted sum above one.

6. The system of claim 1, wherein the neural network comprises a feed-forward neural network.

7. The system of claim 1, wherein as the unweighted sum increases, the tempering factor increases proportionally.

8. The system of claim 1, wherein the regulated confidence of predictions achieves improved calibration compared to untempered neural networks.

9. The system of claim 1, wherein predictions quantify likelihood of a specific pattern, relationship, or characteristic being present in the transactional data.

10. A method for training a neural network, the method comprising:

receiving, from a database, transactional data, wherein the transactional data comprises structured data records in tabular format having mixed data types including binary, categorical, and continuous features;

performing data transformation of the transactional data based on data type, wherein binary data transforms to zeros and ones, categorical data transforms to numerical indices, and continuous data is transformed by scaling to values between zero and one;

constructing tensor representations for each transformed data type;

combining the binary tensor representation and the categorical tensor representations to generate a unified indexing matrix for embedding vector lookup, wherein the unified indexing matrix concatenates indices from both tensor types for embedding vector lookup;

upon a look-up request, retrieving embedding vectors from the unified indexing matrix;

calculating a masked sum of binary features ones;

calculating a total sum of L2 norms of categorical embedding vectors, wherein each L2 norm is computed as the square root of the sum of squared vector components and passed through a sigmoid activation function;

calculating a total sum of continuous feature values;

combining the masked sum of binary feature ones, the total sum of L2 norms, and the total sum of continuous feature values to generate a total unweighted sum of features;

calculating a tempering factor by applying a sequence of operations to the total unweighted sum, wherein the sequence of operation comprises: a subtraction of one, multiplication by a tempering parameter, and addition of one, wherein value of the tempering parameter is indicative of strength of a tempering mechanism; and modifying the neural network to a tempered neural network by applying and positioning the tempering mechanism as a single confiden gate, which calculates the tempering factor, at some point between the neural network input and output laver;

providing the tempering factor to a neural network training model processing the transformed data, wherein an intermediate output of the neural network is divided by the tempering factor to generate predictions with reduced confidence scaling proportional to feature quantity;

wherein the tempering mechanism enables neural network training convergence at learning rates 2-5 times higher than untempered neural networks while maintaining classification accuracy within 2% of optimal performance, and wherein a regulated confidence of predictions achieve calibration error below 0.05 compared to 0.15 or higher for untempered networks.

11. The method of claim 10, wherein the step of performing data transformation of the transactional data based on data type further comprises transforming date data in the transactional data into separate numerical values for year, month, and day.

12. The method of claim 10, wherein when the unweighted sum of features equals one, the tempering factor equals one.

13. The method of claim 10, further comprises normalizing the transformed data using batch normalization prior to processing by the neural network.

14. The method of claim 10, wherein calculating the tempering factor is performed using vectorized operations optimized for parallel processing hardware.

15. The method of claim 10, wherein the tempering factor increases linearly with increases in the unweighted sum above one.

16. The method of claim 10, wherein the regulated confidence of predictions achieves improved calibration compared to untempered neural networks.

17. The method of claim 10, wherein the regulated confidence of predictions is neither overconfident nor underconfident.

18. The method of claim 10, wherein predictions quantify likelihood of a specific pattern, relationship, or characteristic being present in the transactional data.

* * * * *